United States Patent
Peralta et al.

(10) Patent No.: US 11,711,112 B2
(45) Date of Patent: *Jul. 25, 2023

(54) WIRELESS POWER TRANSMISSION SYSTEMS AND METHODS WITH SELECTIVE SIGNAL DAMPING ACTIVE MODE

(71) Applicant: NuCurrent, Inc., Chicago, IL (US)

(72) Inventors: Alberto Peralta, Chicago, IL (US); Jason Luzinski, Chicago, IL (US)

(73) Assignee: NuCurrent, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/161,242

(22) Filed: Jan. 28, 2021

(65) Prior Publication Data

US 2022/0239339 A1    Jul. 28, 2022

(51) Int. Cl.
| | |
|---|---|
| *H04B 5/00* | (2006.01) |
| *H02J 50/80* | (2016.01) |
| *H02J 50/20* | (2016.01) |
| *H02J 50/12* | (2016.01) |

(52) U.S. Cl.
CPC ............ *H04B 5/0037* (2013.01); *H02J 50/12* (2016.02); *H02J 50/20* (2016.02); *H02J 50/80* (2016.02)

(58) Field of Classification Search
None
See application file for complete search history.

(56) References Cited

U.S. PATENT DOCUMENTS

| | | | |
|---|---|---|---|
| 6,591,139 B2 * | 7/2003 | Loftin | A61N 1/3787 607/66 |
| 9,919,610 B1 | 3/2018 | Sarwat et al. | |
| 10,509,466 B1 | 12/2019 | Miller et al. | |
| 10,649,238 B2 | 5/2020 | Rousseau | |

(Continued)

FOREIGN PATENT DOCUMENTS

| | | |
|---|---|---|
| KR | 20120078995 A | 7/2012 |
| KR | 20150050076 A | 5/2015 |

(Continued)

OTHER PUBLICATIONS

International Searching Authority, PCT International Search Report and Written Opinion, PCT International Application No. PCT/US2022/014405 dated May 13, 2022, 10 pages.

(Continued)

*Primary Examiner* — Daniel C Puentes
(74) *Attorney, Agent, or Firm* — Lee Sullivan Shea & Smith LLP

(57) ABSTRACT

A method for operating a wireless power transmission system includes providing a driving signal for driving a transmission antenna of the wireless power transmission system, the driving signal based, at least, on an operating frequency for the wireless power transmission system. The method further includes receiving, at a damping transistor of a damping circuit, damping signals for switching the damping transistor to one of an active mode and an inactive mode to control signal damping during transmission or receipt of wireless data signals. The method further includes selectively damping, by the damping circuit, the AC wireless signals, during transmission of the wireless data signals if the damping signals set the damping circuit to the active mode.

16 Claims, 20 Drawing Sheets

(56) References Cited

U.S. PATENT DOCUMENTS

| | | |
|---|---|---|
| 11,218,026 B1 | 1/2022 | Hansen et al. |
| 2005/0118971 A1* | 6/2005 | Arai ............... H03G 1/0088 455/333 |
| 2010/0253310 A1 | 10/2010 | Fonderie |
| 2011/0217927 A1 | 9/2011 | Ben-Shalom et al. |
| 2011/0222154 A1 | 9/2011 | Choi et al. |
| 2012/0086512 A1* | 4/2012 | Sharma ............. H03G 3/3047 330/278 |
| 2013/0039395 A1* | 2/2013 | Norconk ........... H04B 5/0031 375/268 |
| 2013/0099586 A1* | 4/2013 | Kato ................ H02J 50/005 307/104 |
| 2013/0321055 A1* | 12/2013 | Gagne .............. H02H 9/04 327/309 |
| 2014/0152253 A1 | 6/2014 | Ozaki et al. |
| 2014/0300199 A1 | 10/2014 | Shichino et al. |
| 2015/0194811 A1 | 7/2015 | Mao |
| 2015/0357907 A1 | 12/2015 | Koo |
| 2016/0094042 A1 | 3/2016 | Maniktala et al. |
| 2016/0197511 A1 | 7/2016 | Atasoy et al. |
| 2016/0197512 A1 | 7/2016 | Song et al. |
| 2016/0204646 A1 | 7/2016 | Park et al. |
| 2016/0241046 A1 | 8/2016 | Lee et al. |
| 2016/0261314 A1 | 9/2016 | Cox et al. |
| 2018/0097401 A1 | 4/2018 | Gaskill et al. |
| 2019/0033622 A1 | 1/2019 | Olgun et al. |
| 2019/0109498 A1 | 4/2019 | Stingu et al. |
| 2019/0255965 A1 | 8/2019 | Hocke et al. |
| 2019/0318589 A1 | 10/2019 | Howell et al. |
| 2020/0133030 A1 | 4/2020 | Eriksson et al. |
| 2020/0244236 A1 | 7/2020 | Hwang et al. |
| 2020/0313454 A1 | 10/2020 | Ma |
| 2021/0012176 A1 | 1/2021 | Freitas et al. |
| 2021/0143672 A1 | 5/2021 | Moubedi et al. |

FOREIGN PATENT DOCUMENTS

| | | |
|---|---|---|
| KR | 20160084152 A | 7/2016 |
| KR | 102087300 B1 | 3/2020 |
| WO | 2008101151 A2 | 8/2008 |
| WO | 2017052158 A1 | 3/2017 |

OTHER PUBLICATIONS

International Searching Authority, PCT International Search Report and Written Opinion, PCT International Application No. PCT/US2021/039443 dated Oct. 19, 2021, 9 pages.

International Searching Authority, PCT International Search Report and Written Opinion, PCT International Application No. PCT/US2021/042575 dated Nov. 11, 2021, 8 pages.

International Searching Authority, PCT International Search Report and Written Opinion, PCT International Application No. PCT/US2022/040934 dated Dec. 1, 2022, 9 pages.

\* cited by examiner

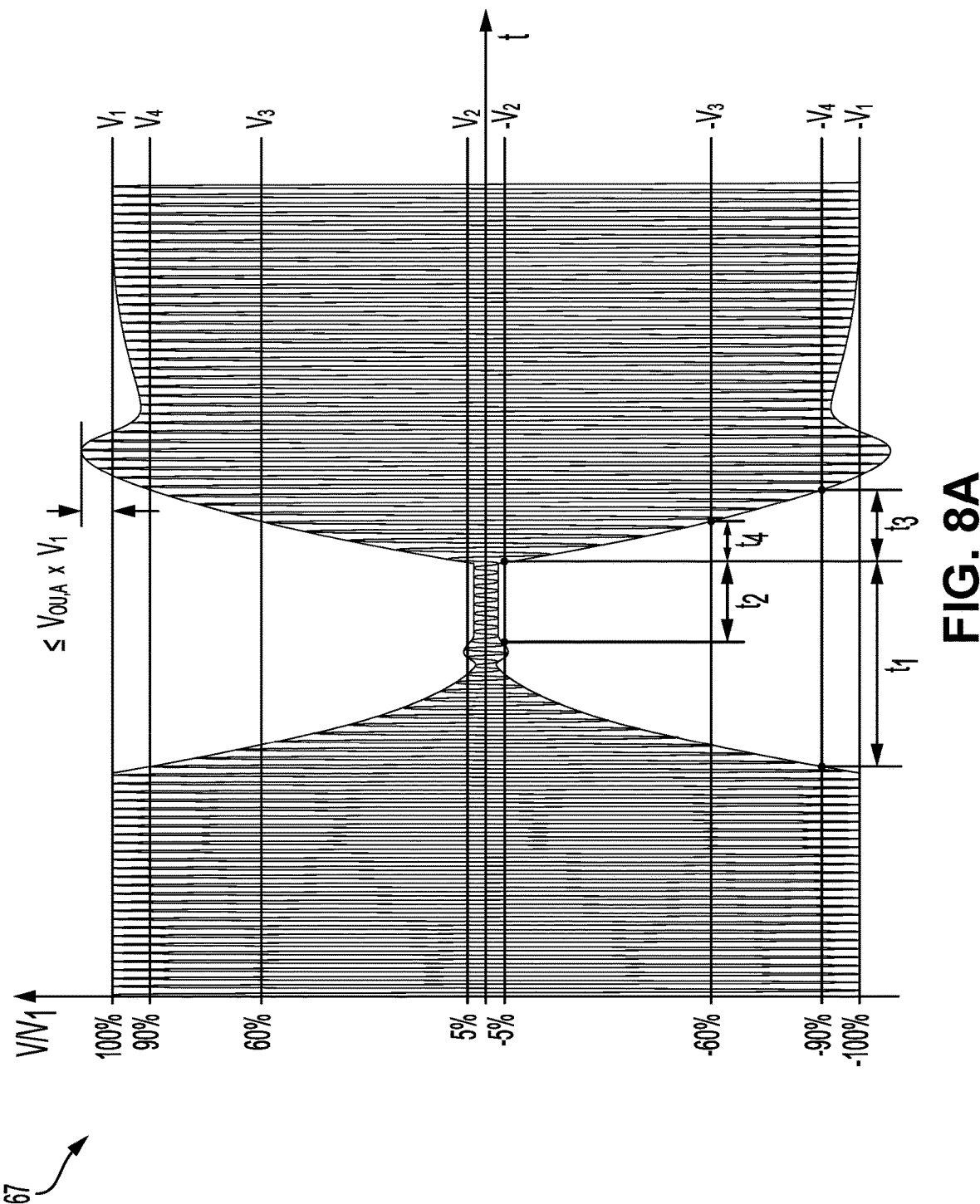

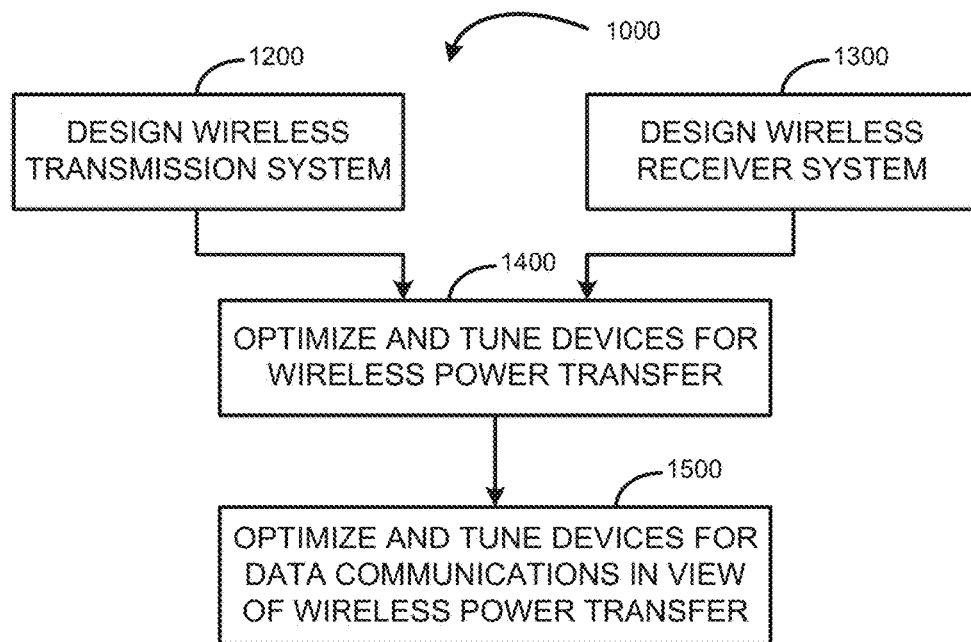
FIG. 14
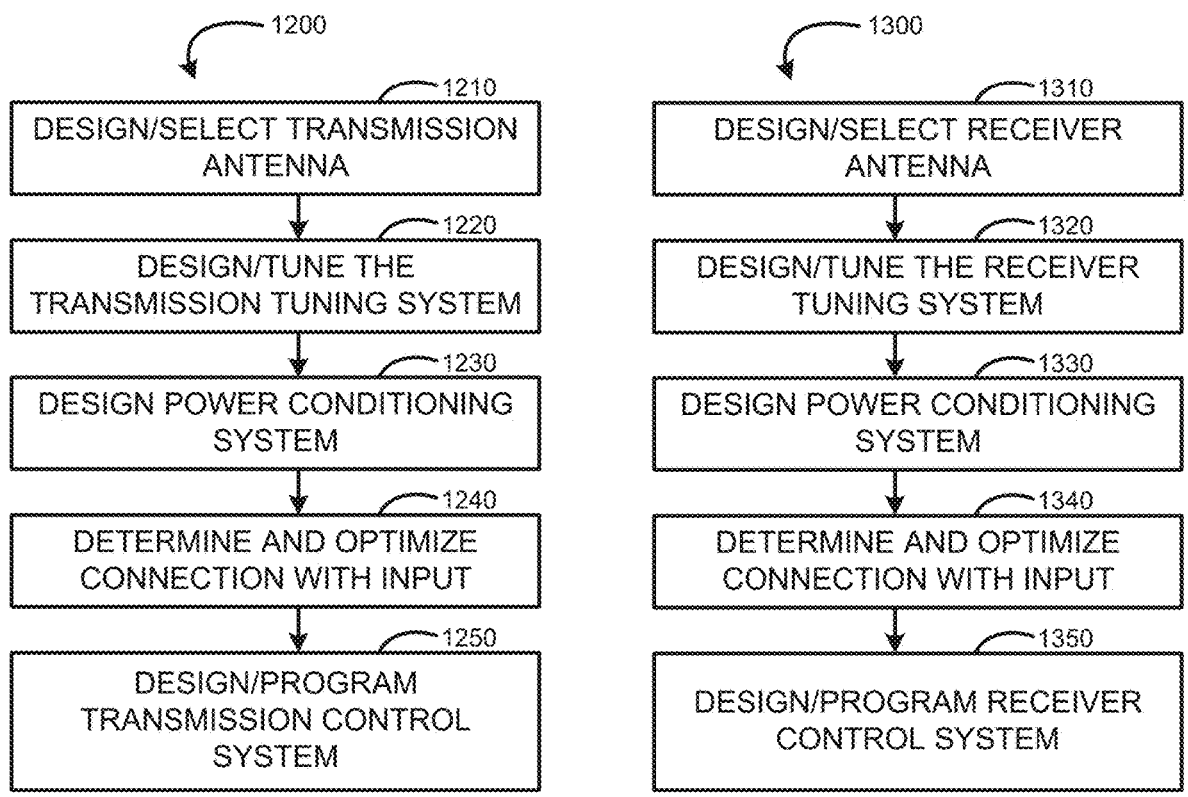
FIG. 15  FIG. 16

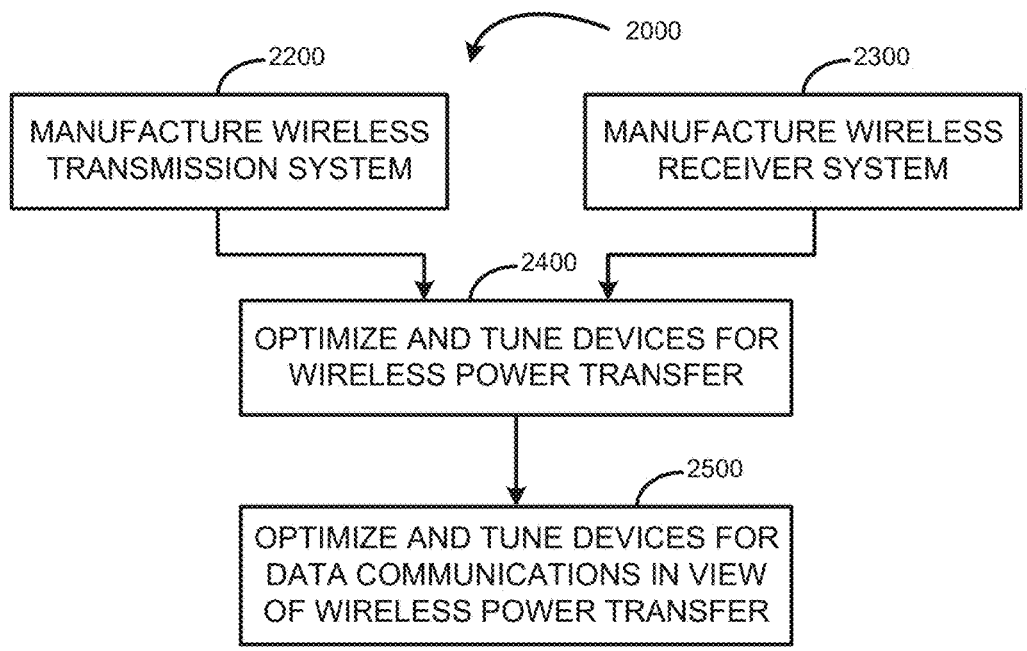
FIG. 17
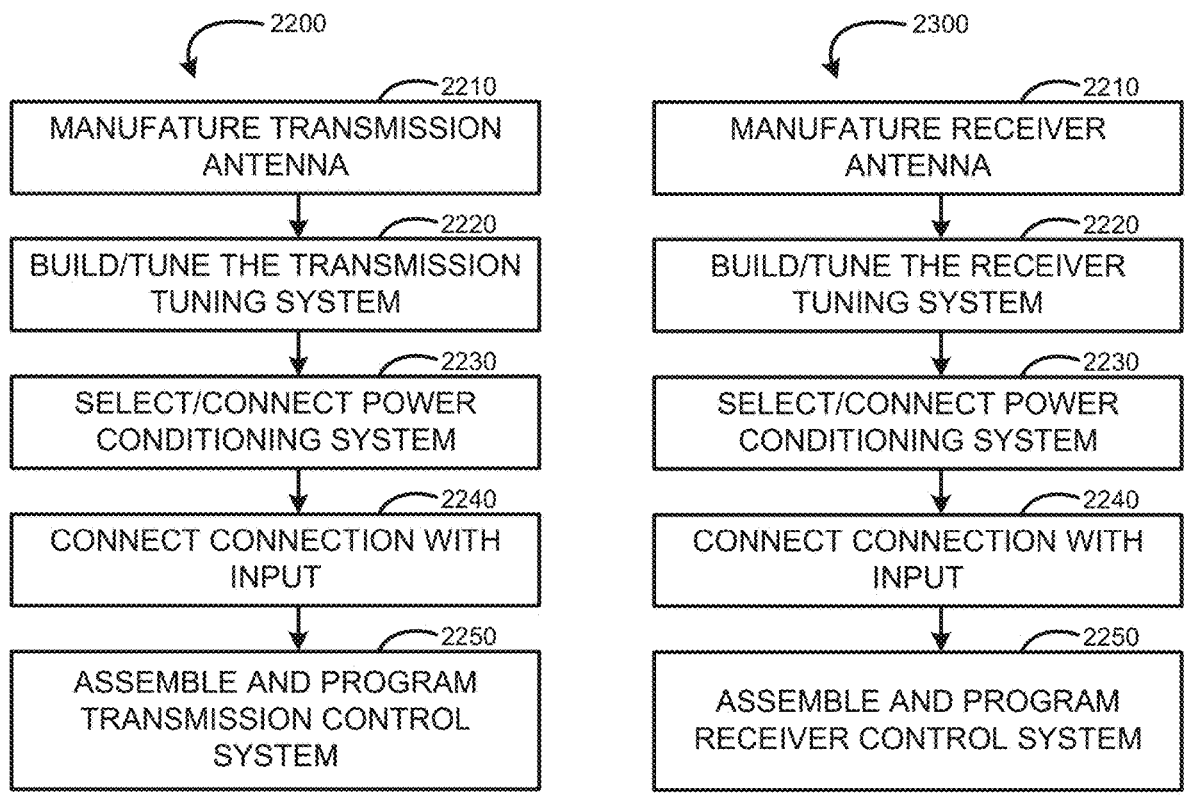
FIG. 18          FIG. 19

WIRELESS POWER TRANSMISSION SYSTEMS AND METHODS WITH SELECTIVE SIGNAL DAMPING ACTIVE MODE

TECHNICAL FIELD

The present disclosure generally relates to systems and methods for wireless transfer of electrical power and/or electrical data signals, and, more particularly, to high frequency wireless power transfer at elevated power levels, while maintaining communications fidelity.

BACKGROUND

Wireless connection systems are used in a variety of applications for the wireless transfer of electrical energy, electrical power, electromagnetic energy, electrical data signals, among other known wirelessly transmittable signals. Such systems often use inductive wireless power transfer, which occurs when magnetic fields created by a transmitting element induce an electric field, and hence, an electric current, in a receiving element. These transmitting and receiving elements will often take the form of coiled wires and/or antennas.

Transmission of one or more of electrical energy, electrical power, electromagnetic energy and/or electronic data signals from one of such coiled antennas to another, generally, operates at an operating frequency and/or an operating frequency range. The operating frequency may be selected for a variety of reasons, such as, but not limited to, power transfer characteristics, power level characteristics, self-resonant frequency restraints, design requirements, adherence to standards bodies' required characteristics (e.g. electromagnetic interference (EMI) requirements, specific absorption rate (SAR) requirements, among other things), bill of materials (BOM), and/or form factor constraints, among other things. It is to be noted that, "self-resonating frequency," as known to those having skill in the art, generally refers to the resonant frequency of a passive component (e.g., an inductor) due to the parasitic characteristics of the component.

When such systems operate to wirelessly transfer power from a transmission system to a receiver system, via the coils and/or antennas, it is often desired to simultaneously or intermittently communicate electronic data from one system to the other. To that end, a variety of communications systems, methods, and/or apparatus have been utilized for combined wireless power and wireless data transfer. In some example systems, wireless power transfer related communications (e.g., validation procedures, electronic characteristics data communications, voltage data, current data, device type data, among other contemplated data communications) are performed using other circuitry, such as an optional Near Field Communications (NFC) antenna utilized to compliment the wireless power system and/or additional Bluetooth chipsets for data communications, among other known communications circuits and/or antennas.

However, using additional antennas and/or circuitry can give rise to several disadvantages. For instance, using additional antennas and/or circuitry can be inefficient and/or can increase the BOM of a wireless power system, which raises the cost for putting wireless power into an electronic device. Further, in some such systems, out of band communications caused by such additional antennas may result in interference, such out of band cross-talk between such antennas.

Further yet, inclusion of such additional antennas and/or circuitry can result in worsened EMI, as introduction of the additional system will cause greater harmonic distortion, in comparison to a system wherein both a wireless power signal and a data signal are within the same channel. Still further, inclusion of additional antennas and/or circuitry hardware, for communications, may increase the area within a device, for which the wireless power systems and/or components thereof reside, complicating a build of an end product.

To avoid these issues, as has been illustrated with modern NFC Direct Charge (NFC-DC) systems and/or NFC Wireless Charging systems in commercial devices, legacy hardware and/or hardware based on legacy devices may be leveraged to implement both wireless power transfer and data transfer, either simultaneously or in an alternating manner. However, current communications antennas and/or circuits for high frequency communications, when leveraged for wireless power transfer, have much lower power level capabilities than lower frequency wireless power transfer systems, such as the Wireless Power Consortium's Qi standard devices. Utilizing higher power levels in current high frequency circuits may result in damage to the legacy equipment.

Additionally, when utilizing higher power transfer capabilities in such high frequency systems, such as those found in legacy systems, wireless communications may be degraded when wireless power transfer exceeds low power levels (e.g., 300 mW transferred and below). However, without clearly communicable and non-distorted data communications, wireless power transfer may not be feasible.

SUMMARY

To that end, new high frequency wireless power transmission systems, which utilize new circuits for allowing higher power transfer (greater than 300 mW), without degrading communications below a desired standard data protocol, are desired.

Wireless transmission systems disclosed herein may include a damping circuit, which is configured for damping an AC wireless signal during transmission of the AC wireless signal and associated data signals. The damping circuit may be configured to reduce rise and fall times during OOK signal transmission, such that the rate of the data signals may not only be compliant and/or legible but may also achieve faster data rates and/or enhanced data ranges, when compared to legacy systems.

Damping circuits of the present disclosure may include one or more of a damping diode, a damping capacitor, a damping resistor, or any combinations thereof for further enhancing signal characteristics and/or signal quality.

In some embodiments wherein the damping circuit includes the damping resistor, the damping resistor is in electrical series with the damping transistor 63 and has a resistance value (ohms) configured such that it dissipates at least some power from the power signal. Such dissipation may serve to accelerate rise and fall times in an amplitude shift keying signal, an OOK signal, and/or combinations thereof.

In some such embodiments, the value of the damping resistor is selected, configured, and/or designed such that the damping resistor dissipates the minimum amount of power to achieve the fastest rise and/or fall times in an in-band signal allowable and/or satisfy standards limitations for minimum rise and/or fall times; thereby achieving data fidelity at maximum efficiency (less power lost to resistance)

as well as maintaining data fidelity when the system is unloaded and/or under lightest load conditions.

In some embodiments wherein the damping circuit includes the damping capacitor, the damping capacitor may be configured to smooth out transition points in an in-band signal and limit overshoot and/or undershoot conditions in such a signal.

In some embodiments wherein the damping circuit includes the damping diode, the diode is positioned such that a current cannot flow out of the damping circuit, when a damping transistor is in an off state. Thus, the diode may prevent power efficiency loss in an AC power signal when the damping circuit is not active.

In accordance with one aspect of the disclosure, a method for operating a wireless power transmission system is disclosed. The method includes providing, by a transmission controller of the wireless power transmission system, a driving signal for driving a transmission antenna of the wireless power transmission system, the driving signal based, at least, on an operating frequency for the wireless power transmission system. The method further includes receiving, by at least one transistor of an amplifier of the wireless power transmission system, the driving signal at a gate of the at least one transistor and inverting, by the at least one transistor, a direct current (DC) input power signal to generate an AC wireless signal at the operating frequency. The method further includes receiving, at a damping transistor of a damping circuit, damping signals for switching the damping transistor to one of an active mode and an inactive mode to control signal damping during transmission or receipt of wireless data signals. The method further includes selectively damping, by the damping circuit, the AC wireless signals, during transmission of the wireless data signals if the damping signals set the damping circuit to the active mode.

In a refinement, the wireless data signals are one of on-off-keyed (OOK) in-band data signals or amplitude-shift-keyed (ASK) in-band data signals.

In a further refinement, determining the damping signals includes determining instructions to switch the damping circuit to the active mode, when transmission or receipt of the wireless data signals begins.

In yet a further refinement, the method further includes determining if transmission or receipt of the wireless signals has begun.

In yet a further refinement, determining if transmission or receipt of the wireless signals has begun includes determining if the wireless data signals have transitioned from a "high" state to a "low" state.

In yet a further refinement, determining if the wireless data signals have transitioned from a "high" state to a "low" state" is based, at least in part, on quality factor information ($Q_{Rx}$) of a wireless receiver system to which the wireless transmission system is configured to transmit the AC wireless signals.

In another further refinement, the method further includes receiving $Q_{Rx}$, by the transmission controller, from a receiver sensing system of the wireless transmission system.

In another further refinement, determining if the transmission or receipt of the wireless data signals has begun includes monitoring the wireless data signals and, if a data start message is detected, then the wireless data signals have ended.

In a further refinement, the method further includes determining if the transmission or receipt of the wireless data signals has begun includes monitoring the wireless data signals and, if a data start message is detected, then the wireless data signals have ended.

In yet a further refinement, determining if transmission or receipt of the wireless data signals has ended includes monitoring a length of time that the wireless data signals have remained high, and, if the length of time meets or exceeds a threshold indicating that the transmission or receipt of the wireless signals has ended, then the transmission or receipt of the wireless data signals has ended.

In yet another further refinement, determining if the transmission or receipt of the wireless data signals has ended includes monitoring the wireless data signals and, if a data end message is detected, then the wireless data signals have ended.

In a refinement, the method further includes instructing a power conditioning system of the wireless power transmission system to raise the input voltage ($V_{PA}$) to the at least one transistor to an elevated input voltage ($V_{PA+}$) when the damping circuit in the active mode, $V_{PA+}$ configured to compensate for power loss in the system due to activation of the damping circuit.

In a further refinement, the method further includes instructing the power conditioning system to reduce $V_{PA+}$ to $V_{PA}$, when the damping signal is deactivated.

In accordance with another aspect of the disclosure, a wireless power transmission system is disclosed. The system includes a transmission antenna, an amplifier, and a transmission controller. The transmission antenna is configured to couple with at least one other antenna and transmit alternating current (AC) wireless signals to the at least one antenna, the AC wireless signals including wireless power signals and wireless data signals, wherein the wireless data signals are one of on-off-keyed (OOK) in-band data signals or amplitude-shift-keyed (ASK) in-band data signals. The amplifier includes at least one transistor and a damping circuit. The at least one transistor is configured to (i) receive a driving signal at a gate of the at least one transistor, the driving signal configured to drive the transmission antenna based on an operating frequency for the wireless power transfer system and (ii) invert a direct current (DC) input power signal based on the driving signal, to generate the AC wireless signal at an operating frequency. The damping circuit is configured to dampen the AC wireless signals during transmission of the wireless data signals, wherein the damping circuit includes at least a damping transistor that is configured to receive a damping signals for switching the damping transistor to one of an active mode and an inactive mode to control signal damping during transmission or receipt of wireless data signals. The transmission controller is configured to (i) provide the driving signals to the at least one transistor, (ii) generate the damping signals by determining when the wireless data signals are transmitted and generating instructions to operate the damping circuit in the active mode when the wireless data signals are transmitted, and (iii) perform one or more of encoding the wireless data signals, decoding the wireless data signals, receiving the wireless data signals, or transmitting the wireless data signals.

In a refinement, the system further includes a voltage regulator configured to provide the direct current (DC) input power to the at least one transistor at an input voltage ($V_{PA}$), wherein the transmission controller is further configured to instruct the voltage regulator to increase $V_{PA}$ to an elevated input voltage ($V_{PA+}$) when the damping circuit is in the active mode, $V_{PA+}$ configured to compensate for power loss in the system due to activation of the damping circuit.

In a further refinement, the transmission controller is further configured to instruct the voltage regulator to reduce $V_{P4+}$ to $V_{P4}$, when the damping signal indicates that the damping signal is to be in the inactive mode.

In a refinement, the damping circuit further includes a damping resistor that is in electrical series with the damping transistor and is configured for dissipating at least some power from the power signal.

In a refinement, the damping circuit further includes a damping capacitor that is in electrical series with, at least, the damping transistor.

In a refinement, the damping circuit further includes a diode that is in electrical series with, at least, the damping transistor and is configured for preventing power efficiency loss in the wireless power signal when the damping circuit is not active.

In accordance with yet another aspect of the disclosure, a non-tangible, machine-readable medium storing instructions is disclosed. The instructions, when executed, cause a controller to determine a driving signal for driving a transmitter antenna of a wireless power transmission system, the driving signal based, at least, on an operating frequency for the wireless power transmission system, provide the driving signal to at least one transistor of an amplifier of the wireless power transmission system at a gate of the at least one transistor, determine damping signals for a damping transistor of a damping circuit, the damping signals configured to switch the damping transistor to one of an active mode and an inactive mode to control signal damping during transmission or receipt of wireless data signals, the wireless data signals encoded in-band of AC wireless power signals, the AC wireless power signals generated based on the driving signal, and provide the damping signals to the damping circuit, the damping signals instructing the damping circuit to selectively damp the AC wireless signals based, at least in part, on wireless data signals that are in-band of the AC wireless signals.

These and other aspects and features of the present disclosure will be better understood when read in conjunction with the accompanying drawings.

BRIEF DESCRIPTION OF THE DRAWINGS

FIG. 8A is an exemplary plot illustrating rise and fall of "on" and "off" conditions when a signal has in-band communications via on-off keying.

FIG. 14 is a flowchart for a method for designing a system for wireless transmission of one or more of electrical energy, electrical power signals, electrical power, electrical electromagnetic energy, electronic data, and combinations thereof, in accordance with FIGS. 1-7, 9-13, and the present disclosure.

FIG. 15 is a flow chart for an exemplary method for designing a wireless transmission system for the system of FIG. 11, in accordance with FIGS. 1-7, 9-13, 14, and the present disclosure.

FIG. 16 is a flow chart for an exemplary method for designing a wireless receiver system for the system of FIG. 11, in accordance with FIGS. 1-7, 9-13, 14, 15 and the present disclosure.

FIG. 17 is a flow chart for an exemplary method for manufacturing a system for wireless transmission of one or more of electrical energy, electrical power signals, electrical power, electrical electromagnetic energy, electronic data, and combinations thereof, in accordance with FIGS. 1-7, 9-13, and the present disclosure.

FIG. 18 is a flow chart for an exemplary method for manufacturing a wireless transmission system for the system of FIG. 17, in accordance with FIGS. 1-7, 9-13, 17, and the present disclosure.

FIG. 19 is a flow chart for an exemplary method for designing a wireless receiver system for the system of FIG. 17, in accordance with FIGS. 1-7, 9-13, 17, 18, and the present disclosure.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto. Additional, different, or fewer components and methods may be included in the systems and methods.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
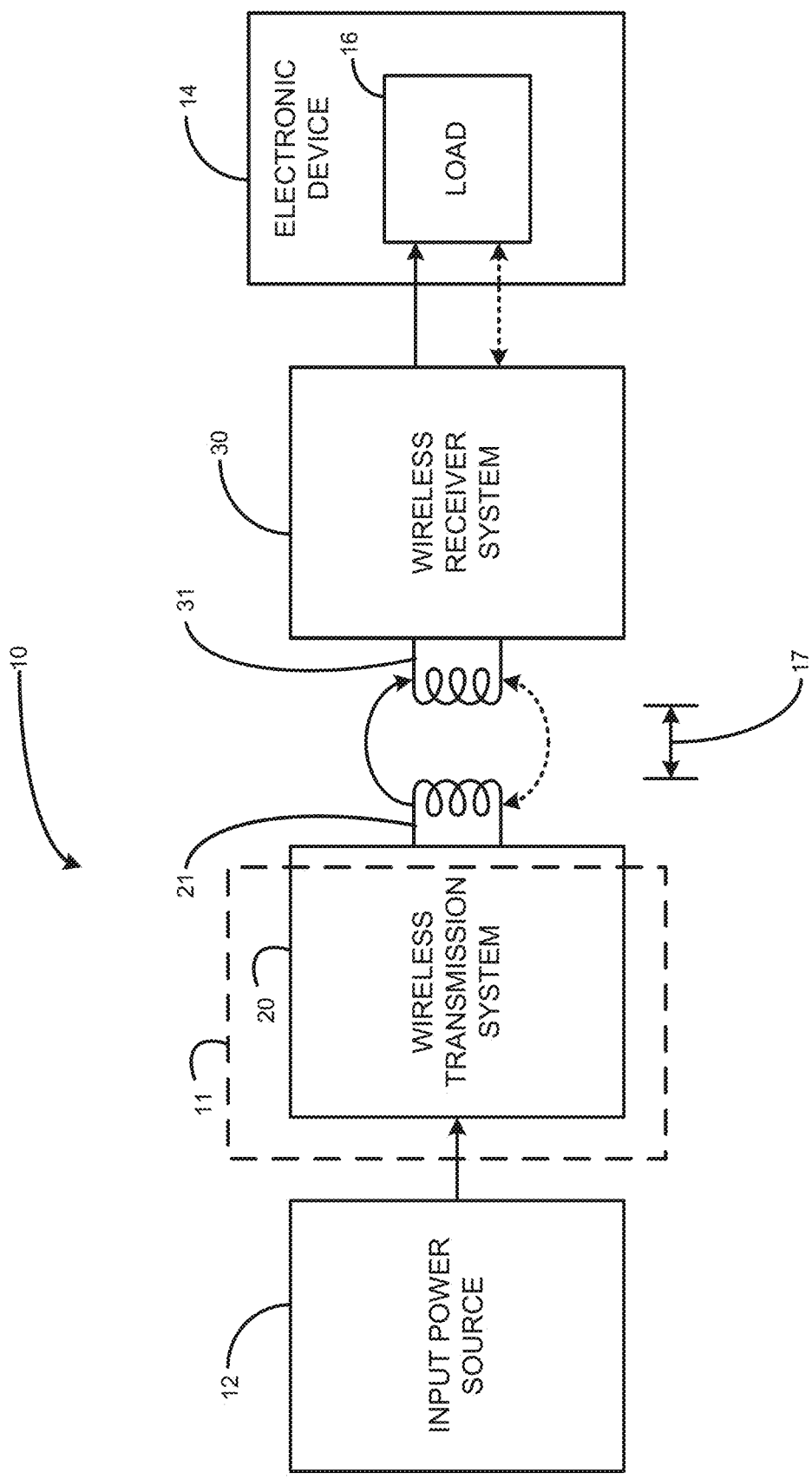
FIG. 1 is a block diagram of an embodiment of a system for wirelessly transferring one or more of electrical energy, electrical power signals, electrical power, electromagnetic energy, electronic data, and combinations thereof, in accordance with the present disclosure.

Referring now to the drawings and with specific reference to FIG. 1, a wireless power transfer system 10 is illustrated. The wireless power transfer system 10 provides for the wireless transmission of electrical signals, such as, but not limited to, electrical energy, electrical power, electrical power signals, electromagnetic energy, and electronically transmittable data ("electronic data"). As used herein, the term "electrical power signal" refers to an electrical signal transmitted specifically to provide meaningful electrical energy for charging and/or directly powering a load, whereas the term "electronic data signal" refers to an electrical signal that is utilized to convey data across a medium.

The wireless power transfer system 10 provides for the wireless transmission of electrical signals via near field magnetic coupling. As shown in the embodiment of FIG. 1, the wireless power transfer system 10 includes a wireless transmission system 20 and a wireless receiver system 30. The wireless receiver system is configured to receive electrical signals from, at least, the wireless transmission system 20. In some examples, such as examples wherein the wireless power transfer system is configured for wireless power transfer via the Near Field Communications Direct Charge (NFC-DC) or Near Field Communications Wireless Charging (NFC WC) draft or accepted standard, the wireless transmission system 20 may be referenced as a "listener" of the NFC-DC wireless transfer system 20 and the wireless receiver system 30 may be referenced as a "poller" of the NFC-DC wireless transfer system.

As illustrated, the wireless transmission system 20 and wireless receiver system 30 may be configured to transmit electrical signals across, at least, a separation distance or gap 17. A separation distance or gap, such as the gap 17, in the context of a wireless power transfer system, such as the system 10, does not include a physical connection, such as a wired connection. There may be intermediary objects located in a separation distance or gap, such as, but not limited to, air, a counter top, a casing for an electronic device, a plastic filament, an insulator, a mechanical wall, among other things; however, there is no physical, electrical connection at such a separation distance or gap.

Thus, the combination of the wireless transmission system 20 and the wireless receiver system 30 create an electrical connection without the need for a physical connection. As used herein, the term "electrical connection" refers to any facilitation of a transfer of an electrical current, voltage, and/or power from a first location, device, component, and/or source to a second location, device, component, and/or destination. An "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless power and/or data transfer, such as, but not limited to, magnetic, electromagnetic, resonant, and/or inductive field, among other wireless power and/or data transfers, connecting a first location, device, component, and/or source to a second location, device, component, and/or destination.

In some cases, the gap 17 may also be referenced as a "Z-Distance," because, if one considers an antenna 21, 31 each to be disposed substantially along respective common X-Y planes, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform, across an envelope of connection distances between the antennas 21, 31. It is contemplated that various tunings, configurations, and/or other parameters may alter the possible maximum distance of the gap 17, such that electrical transmission from the wireless transmission system 20 to the wireless receiver system 30 remains possible.

The wireless power transfer system 10 operates when the wireless transmission system 20 and the wireless receiver system 30 are coupled. As used herein, the terms "couples," "coupled," and "coupling" generally refer to magnetic field coupling, which occurs when a transmitter and/or any components thereof and a receiver and/or any components thereof are coupled to each other through a magnetic field. Such coupling may include coupling, represented by a coupling coefficient (k), that is at least sufficient for an induced electrical power signal, from a transmitter, to be harnessed by a receiver. Coupling of the wireless transmission system 20 and the wireless receiver system 30, in the system 10, may be represented by a resonant coupling coefficient of the system 10 and, for the purposes of wireless power transfer, the coupling coefficient for the system 10 may be in the range of about 0.01 and 0.9.

As illustrated, the wireless transmission system 20 may be associated with a host device 11, which may receive power from an input power source 12. The host device 11 may be any electrically operated device, circuit board, electronic assembly, dedicated charging device, or any other contemplated electronic device. Example host devices 11, with which the wireless transmission system 20 may be associated therewith, include, but are not limited to including, a device that includes an integrated circuit, cases for wearable electronic devices, receptacles for electronic devices, a portable computing device, clothing configured with electronics, storage medium for electronic devices, charging apparatus for one or multiple electronic devices, dedicated electrical charging devices, activity or sport related equipment, goods, and/or data collection devices, among other contemplated electronic devices.

As illustrated, one or both of the wireless transmission system 20 and the host device 11 are operatively associated with an input power source 12. The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB ports and/or adaptors, among other contemplated electrical components).

Electrical energy received by the wireless transmission system 20 is then used for at least two purposes: to provide electrical power to internal components of the wireless transmission system 20 and to provide electrical power to the transmitter antenna 21. The transmitter antenna 21 is configured to wirelessly transmit the electrical signals conditioned and modified for wireless transmission by the wireless transmission system 20 via near-field magnetic coupling (NFMC). Near-field magnetic coupling enables the transfer of signals wirelessly through magnetic induction between the transmitter antenna 21 and a receiving antenna 31 of, or associated with, the wireless receiver system 30. Near-field magnetic coupling may be and/or be referred to as "inductive coupling," which, as used herein, is a wireless power transmission technique that utilizes an alternating electromagnetic field to transfer electrical energy between two antennas. Such inductive coupling is the near field wireless transmission of magnetic energy between two magnetically coupled coils that are tuned to resonate at a similar frequency. Accordingly, such near-field magnetic coupling may enable efficient wireless power transmission via resonant transmission of confined magnetic fields. Further, such near-field magnetic coupling may provide connection via "mutual inductance," which, as defined herein is the production of an electromotive force in a circuit by a change in current in a second circuit magnetically coupled to the first.

In one or more embodiments, the inductor coils of either the transmitter antenna 21 or the receiver antenna 31 are strategically positioned to facilitate reception and/or transmission of wirelessly transferred electrical signals through near field magnetic induction. Antenna operating frequencies may comprise relatively high operating frequency ranges, examples of which may include, but are not limited to, 6.78 MHz (e.g., in accordance with the Rezence and/or Airfuel interface standard and/or any other proprietary interface standard operating at a frequency of 6.78 MHz), 13.56 MHz (e.g., in accordance with the NFC standard, defined by ISO/IEC standard 18092), 27 MHz, and/or an operating frequency of another proprietary operating mode. The operating frequencies of the antennas 21, 31 may be operating frequencies designated by the International Telecommunications Union (ITU) in the Industrial, Scientific, and Medical (ISM) frequency bands, including not limited to 6.78 MHz, 13.56 MHz, and 27 MHz, which are designated for use in wireless power transfer. In systems wherein the wireless power transfer system 10 is operating within the NFC-DC standards and/or draft standards, the operating frequency may be in a range of about 13.553 MHz to about 13.567 MHz.

The transmitting antenna and the receiving antenna of the present disclosure may be configured to transmit and/or receive electrical power having a magnitude that ranges from about 10 milliwatts (mW) to about 500 watts (W). In one or more embodiments the inductor coil of the transmitting antenna 21 is configured to resonate at a transmitting antenna resonant frequency or within a transmitting antenna resonant frequency band.

As known to those skilled in the art, a "resonant frequency" or "resonant frequency band" refers a frequency or frequencies wherein amplitude response of the antenna is at a relative maximum, or, additionally or alternatively, the frequency or frequency band where the capacitive reactance has a magnitude substantially similar to the magnitude of the inductive reactance. In one or more embodiments, the transmitting antenna resonant frequency is at a high frequency, as known to those in the art of wireless power transfer.

The wireless receiver system 30 may be associated with at least one electronic device 14, wherein the electronic device 14 may be any device that requires electrical power for any function and/or for power storage (e.g., via a battery and/or capacitor). Additionally, the electronic device 14 may be any device capable of receipt of electronically transmissible data. For example, the device may be, but is not limited to being, a handheld computing device, a mobile device, a portable appliance, an integrated circuit, an identifiable tag, a kitchen utility device, an electronic tool, an electric vehicle, a game console, a robotic device, a wearable electronic device (e.g., an electronic watch, electronically modified glasses, altered-reality (AR) glasses, virtual reality (VR) glasses, among other things), a portable scanning device, a portable identifying device, a sporting good, an embedded sensor, an Internet of Things (IoT) sensor, IoT enabled clothing, IoT enabled recreational equipment, industrial equipment, medical equipment, a medical device a tablet computing device, a portable control device, a remote controller for an electronic device, a gaming controller, among other things.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data and/or control instructions. Solid lines indicate signal transmission of electrical energy over a physical and/or wireless power transfer, in the form of power signals that are, ultimately, utilized in wireless power transmission from the wireless transmission system 20 to the wireless receiver system 30. Further, dotted lines are utilized to illustrate electronically transmittable data signals, which ultimately may be wirelessly transmitted from the wireless transmission system 20 to the wireless receiver system 30.

While the systems and methods herein illustrate the transmission of wirelessly transmitted energy, wireless power signals, wirelessly transmitted power, wirelessly transmitted electromagnetic energy, and/or electronically transmittable data, it is certainly contemplated that the systems, methods, and apparatus disclosed herein may be utilized in the transmission of only one signal, various combinations of two signals, or more than two signals and, further, it is contemplated that the systems, method, and apparatus disclosed herein may be utilized for wireless transmission of other electrical signals in addition to or uniquely in combination with one or more of the above mentioned signals. In some examples, the signal paths of solid or dotted lines may represent a functional signal path, whereas, in practical application, the actual signal is routed through additional components en route to its indicated destination. For example, it may be indicated that a data signal routes from a communications apparatus to another communications apparatus; however, in practical application, the data signal may be routed through an amplifier, then through a transmission antenna, to a receiver antenna, where, on the receiver end, the data signal is decoded by a respective communications device of the receiver.

Figure 2:
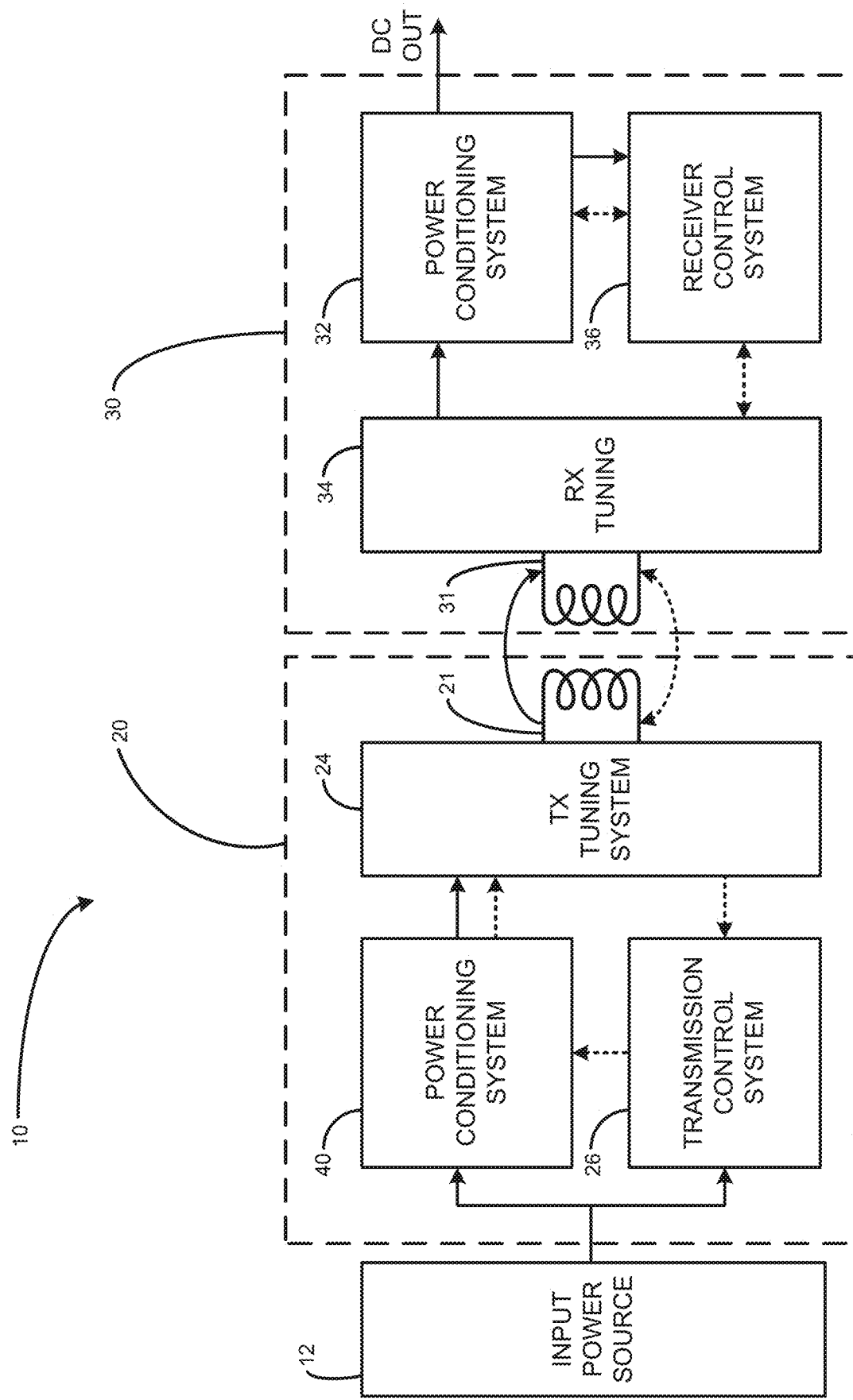
FIG. 2 is a block diagram illustrating components of a wireless transmission system of the system of FIG. 1 and a wireless receiver system of the system of FIG. 1, in accordance with FIG. 1 and the present disclosure.

Turning now to FIG. 2, the wireless connection system 10 is illustrated as a block diagram including example subsystems of both the wireless transmission system 20 and the wireless receiver system 30. The wireless transmission system 20 may include, at least, a power conditioning system 40, a transmission control system 26, a transmission tuning system 24, and the transmission antenna 21. A first portion of the electrical energy input from the input power source 12 is configured to electrically power components of the wireless transmission system 20 such as, but not limited to, the transmission control system 26. A second portion of the electrical energy input from the input power source 12 is conditioned and/or modified for wireless power transmission, to the wireless receiver system 30, via the transmission antenna 21. Accordingly, the second portion of the input energy is modified and/or conditioned by the power conditioning system 40. While not illustrated, it is certainly contemplated that one or both of the first and second portions of the input electrical energy may be modified, conditioned, altered, and/or otherwise changed prior to receipt by the power conditioning system 40 and/or transmission control system 26, by further contemplated subsystems (e.g., a voltage regulator, a current regulator, switching systems, fault systems, safety regulators, among other things).

Figure 3:
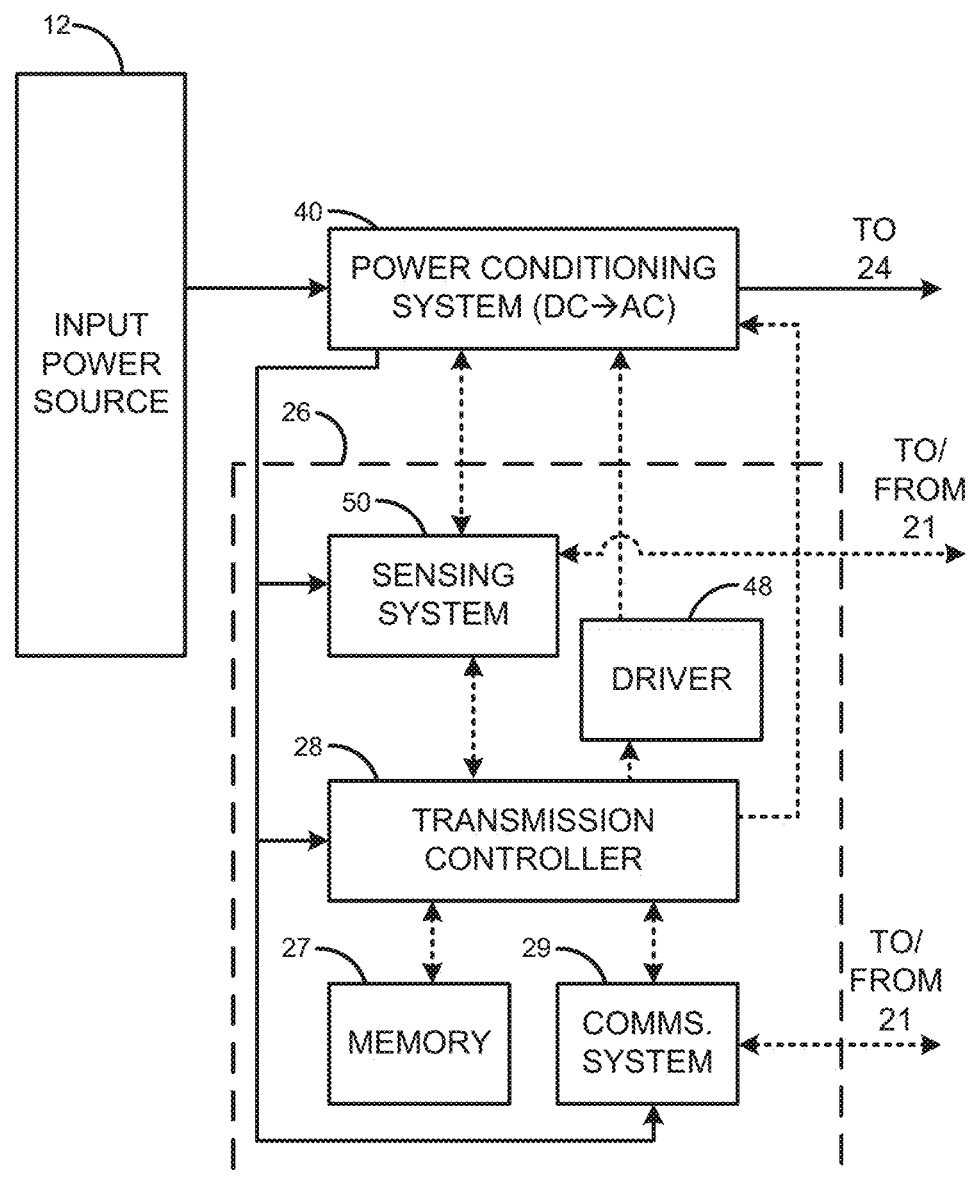
FIG. 3 is a block diagram illustrating components of a transmission control system of the wireless transmission system of FIG. 2, in accordance with FIG. 1, FIG. 2, and the present disclosure.

Referring now to FIG. 3, with continued reference to FIGS. 1 and 2, subcomponents and/or systems of the transmission control system 26 are illustrated. The transmission control system 26 may include a sensing system 50, a transmission controller 28, a communications system 29, a driver 48, and a memory 27.

The transmission controller 28 may be any electronic controller or computing system that includes, at least, a processor which performs operations, executes control algorithms, stores data, retrieves data, gathers data, controls and/or provides communication with other components and/or subsystems associated with the wireless transmission system 20, and/or performs any other computing or controlling task desired. The transmission controller 28 may be a single controller or may include more than one controller disposed to control various functions and/or features of the wireless transmission system 20. Functionality of the transmission controller 28 may be implemented in hardware and/or software and may rely on one or more data maps relating to the operation of the wireless transmission system 20. To that end, the transmission controller 28 may be operatively associated with the memory 27. The memory may include one or more of internal memory, external memory, and/or remote memory (e.g., a database and/or server operatively connected to the transmission controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

While particular elements of the transmission control system 26 are illustrated as independent components and/or circuits (e.g., the driver 48, the memory 27, the communications system 29, the sensing system 50, among other contemplated elements) of the transmission control system 26, such components may be integrated with the transmission controller 28. In some examples, the transmission controller 28 may be an integrated circuit configured to include functional elements of one or both of the transmission controller 28 and the wireless transmission system 20, generally.

As illustrated, the transmission controller 28 is in operative association, for the purposes of data transmission, receipt, and/or communication, with, at least, the memory 27, the communications system 29, the power conditioning system 40, the driver 48, and the sensing system 50. The driver 48 may be implemented to control, at least in part, the operation of the power conditioning system 40. In some examples, the driver 48 may receive instructions from the transmission controller 28 to generate and/or output a generated pulse width modulation (PWM) signal to the power conditioning system 40. In some such examples, the PWM signal may be configured to drive the power conditioning system 40 to output electrical power as an alternating current signal, having an operating frequency defined by the PWM signal. In some examples, PWM signal may be configured to generate a duty cycle for the AC power signal output by the power conditioning system 40. In some such examples, the duty cycle may be configured to be about 50% of a given period of the AC power signal.

The sensing system may include one or more sensors, wherein each sensor may be operatively associated with one or more components of the wireless transmission system 20 and configured to provide information and/or data. The term "sensor" is used in its broadest interpretation to define one or more components operatively associated with the wireless transmission system 20 that operate to sense functions, conditions, electrical characteristics, operations, and/or operating characteristics of one or more of the wireless transmission system 20, the wireless receiving system 30, the input power source 12, the host device 11, the transmission antenna 21, the receiver antenna 31, along with any other components and/or subcomponents thereof.

Figure 4:
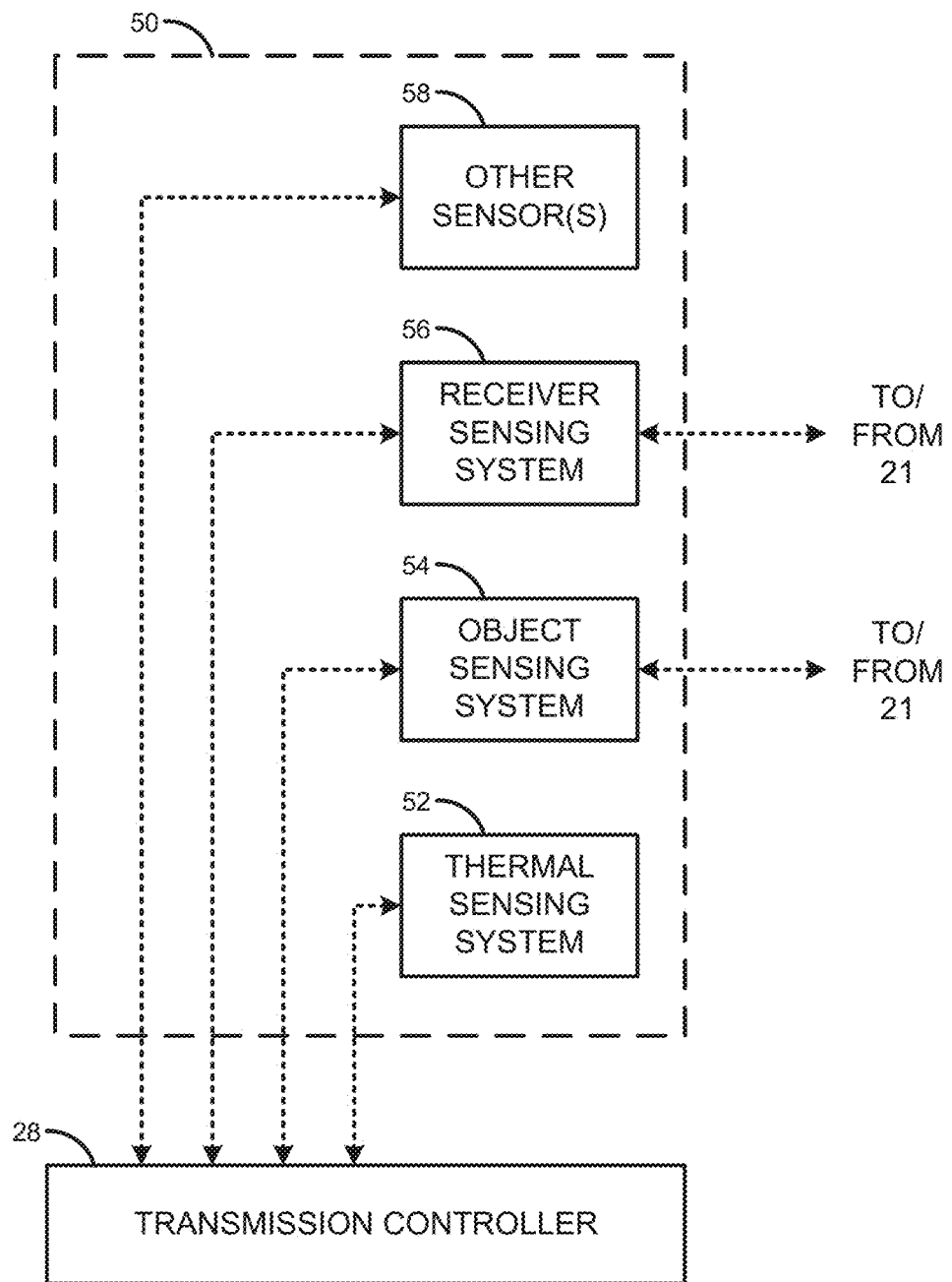
FIG. 4 is a block diagram illustrating components of a sensing system of the transmission control system of FIG. 3, in accordance with FIGS. 1-3 and the present disclosure.

As illustrated in the embodiment of FIG. 4, the sensing system 50 may include, but is not limited to including, a thermal sensing system 52, an object sensing system 54, a receiver sensing system 56, and/or any other sensor(s) 58. Within these systems, there may exist even more specific optional additional or alternative sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 54, may be a foreign object detection (FOD) system.

Each of the thermal sensing system 52, the object sensing system 54, the receiver sensing system 56 and/or the other sensor(s) 58, including the optional additional or alternative systems, are operatively and/or communicatively connected to the transmission controller 28. The thermal sensing system 52 is configured to monitor ambient and/or component temperatures within the wireless transmission system 20 or other elements nearby the wireless transmission system 20. The thermal sensing system 52 may be configured to detect a temperature within the wireless transmission system 20 and, if the detected temperature exceeds a threshold temperature, the transmission controller 28 prevents the wireless transmission system 20 from operating. Such a threshold temperature may be configured for safety considerations, operational considerations, efficiency considerations, and/or any combinations thereof. In a non-limiting example, if, via input from the thermal sensing system 52, the transmission controller 28 determines that the temperature within the wireless transmission system 20 has increased from an acceptable operating temperature to an undesired operating temperature (e.g., in a non-limiting example, the internal temperature increasing from about 20° Celsius (C) to about 50° C., the transmission controller 28 prevents the operation of the wireless transmission system 20 and/or reduces levels of power output from the wireless transmission system 20. In some non-limiting examples, the thermal sensing system 52 may include one or more of a thermocouple, a thermistor, a negative temperature coefficient (NTC) resistor, a resistance temperature detector (RTD), and/or any combinations thereof.

As depicted in FIG. 4, the transmission sensing system 50 may include the object sensing system 54. The object sensing system 54 may be configured to detect one or more of the wireless receiver system 30 and/or the receiver antenna 31, thus indicating to the transmission controller 28 that the receiver system 30 is proximate to the wireless transmission system 20. Additionally or alternatively, the object sensing system 54 may be configured to detect presence of unwanted objects in contact with or proximate to the wireless transmission system 20. In some examples, the object sensing system 54 is configured to detect the presence of an undesired object. In some such examples, if the transmission controller 28, via information provided by the object sensing system 54, detects the presence of an undesired object, then the transmission controller 28 prevents or otherwise modifies operation of the wireless transmission system 20. In some examples, the object sensing system 54 utilizes an impedance change detection scheme, in which the transmission controller 28 analyzes a change in electrical impedance observed by the transmission antenna 20 against a known, acceptable electrical impedance value or range of electrical impedance values.

Additionally or alternatively, the object sensing system 54 may utilize a quality factor (Q) change detection scheme, in which the transmission controller 28 analyzes a change from a known quality factor value or range of quality factor values of the object being detected, such as the receiver antenna 31. The "quality factor" or "Q" of an inductor can be defined as (frequency (Hz)×inductance (H))/resistance (ohms), where frequency is the operational frequency of the circuit, inductance is the inductance output of the inductor and resistance is the combination of the radiative and reactive resistances that are internal to the inductor. "Quality factor," as defined herein, is generally accepted as an index (figure of measure) that measures the efficiency of an apparatus like an antenna, a circuit, or a resonator. In some examples, the object sensing system 54 may include one or more of an optical sensor, an electro-optical sensor, a Hall effect sensor, a proximity sensor, and/or any combinations thereof.

The receiver sensing system 56 is any sensor, circuit, and/or combinations thereof configured to detect presence of any wireless receiving system that may be couplable with the wireless transmission system 20. In some examples, the receiver sensing system 56 and the object sensing system 54 may be combined, may share components, and/or may be embodied by one or more common components. In some examples, if the presence of any such wireless receiving system is detected, wireless transmission of electrical energy, electrical power, electromagnetic energy, and/or data by the wireless transmission system 20 to said wireless receiving system is enabled. In some examples, if the presence of a wireless receiver system is not detected, continued wireless transmission of electrical energy, electrical power, electromagnetic energy, and/or data is prevented from occurring. Accordingly, the receiver sensing system 56 may include one or more sensors and/or may be operatively associated with one or more sensors that are configured to analyze electrical characteristics within an environment of or proximate to the wireless transmission system 20 and, based on the electrical characteristics, determine presence of a wireless receiver system 30.

Figure 5:
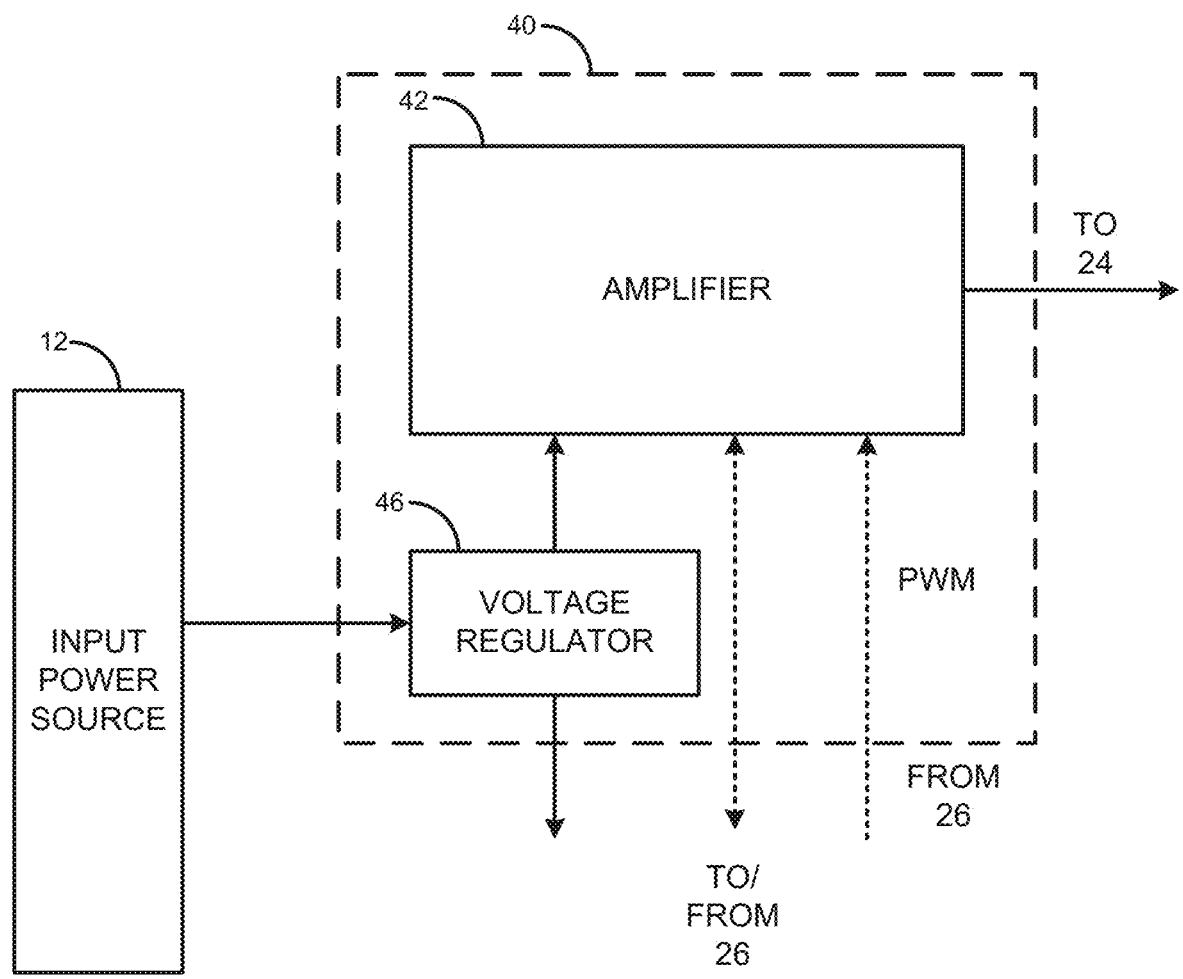
FIG. 5 is a block diagram illustrating components of a power conditioning system of the wireless transmission system of FIG. 2, in accordance with FIG. 1, FIG. 2, and the present disclosure.

Referring now to FIG. 5, and with continued reference to FIGS. 1-4, a block diagram illustrating an embodiment of the power conditioning system 40 is illustrated. At the power conditioning system 40, electrical power is received, generally, as a DC power source, via the input power source 12 itself or an intervening power converter, converting an AC source to a DC source (not shown). A voltage regulator 46 receives the electrical power from the input power source 12 and is configured to provide electrical power for transmission by the antenna 21 and provide electrical power for powering components of the wireless transmission system 21. Accordingly, the voltage regulator 46 is configured to convert the received electrical power into at least two electrical power signals, each at a proper voltage for operation of the respective downstream components: a first electrical power signal to electrically power any components of the wireless transmission system 20 and a second portion conditioned and modified for wireless transmission to the wireless receiver system 30. As illustrated in FIG. 3, such a first portion is transmitted to, at least, the sensing system 50, the transmission controller 28, and the communications system 29; however, the first portion is not limited to transmission to just these components and can be transmitted to any electrical components of the wireless transmission system 20.

The second portion of the electrical power is provided to an amplifier 42 of the power conditioning system 40, which is configured to condition the electrical power for wireless transmission by the antenna 21. The amplifier may function as an invertor, which receives an input DC power signal from the voltage regulator 46 and generates an AC as output, based, at least in part, on PWM input from the transmission control system 26. The amplifier 42 may be or include, for example, a power stage invertor, such as a dual field effect transistor power stage invertor or a quadruple field effect transistor power stage invertor. The use of the amplifier 42 within the power conditioning system 40 and, in turn, the wireless transmission system 20 enables wireless transmission of electrical signals having much greater amplitudes than if transmitted without such an amplifier. For example, the addition of the amplifier 42 may enable the wireless transmission system 20 to transmit electrical energy as an electrical power signal having electrical power from about 10 mW to about 500 W. In some examples, the amplifier 42 may be or may include one or more class-E power amplifiers. Class-E power amplifiers are efficiently tuned switching power amplifiers designed for use at high frequencies (e.g., frequencies from about 1 MHz to about 1 GHz). Generally, a class-E amplifier employs a single-pole switching element and a tuned reactive network between the switch and an output load (e.g., the antenna 21). Class E amplifiers may achieve high efficiency at high frequencies by only operating the switching element at points of zero current (e.g., on-to-off switching) or zero voltage (off to on switching). Such switching characteristics may minimize power lost in the switch, even when the switching time of the device is long compared to the frequency of operation. However, the amplifier 42 is certainly not limited to being a class-E power amplifier and may be or may include one or more of a class D amplifier, a class EF amplifier, an H invertor amplifier, and/or a push-pull invertor, among other amplifiers that could be included as part of the amplifier 42.

Figure 6:
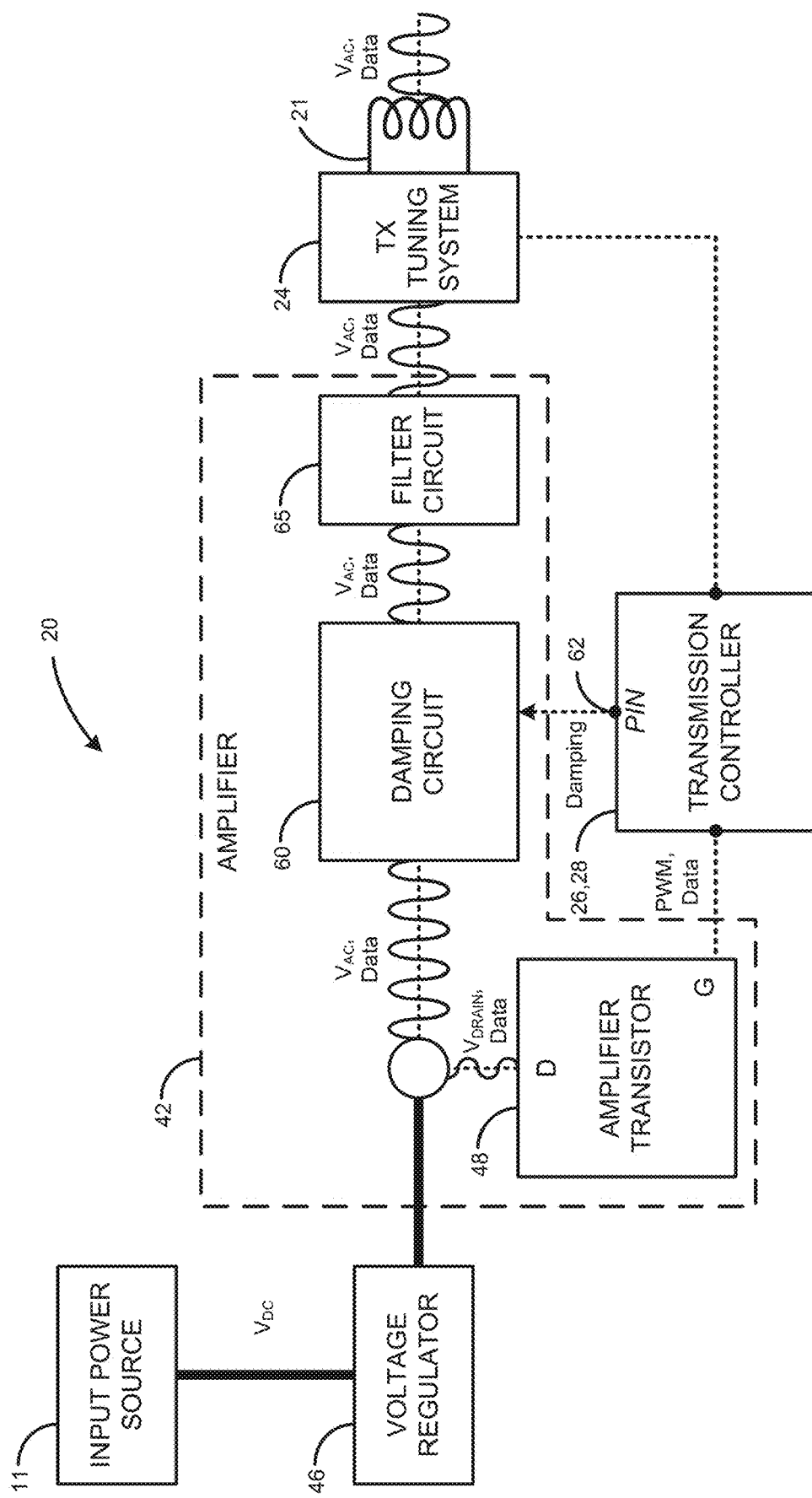
FIG. 6 is a block diagram of elements of the wireless transmission system of FIGS. 1-5, further illustrating components of an amplifier of the power conditioning system of FIG. 5 and signal characteristics for wireless power transmission, in accordance with FIGS. 1-5 and the present disclosure.
Figure 7:
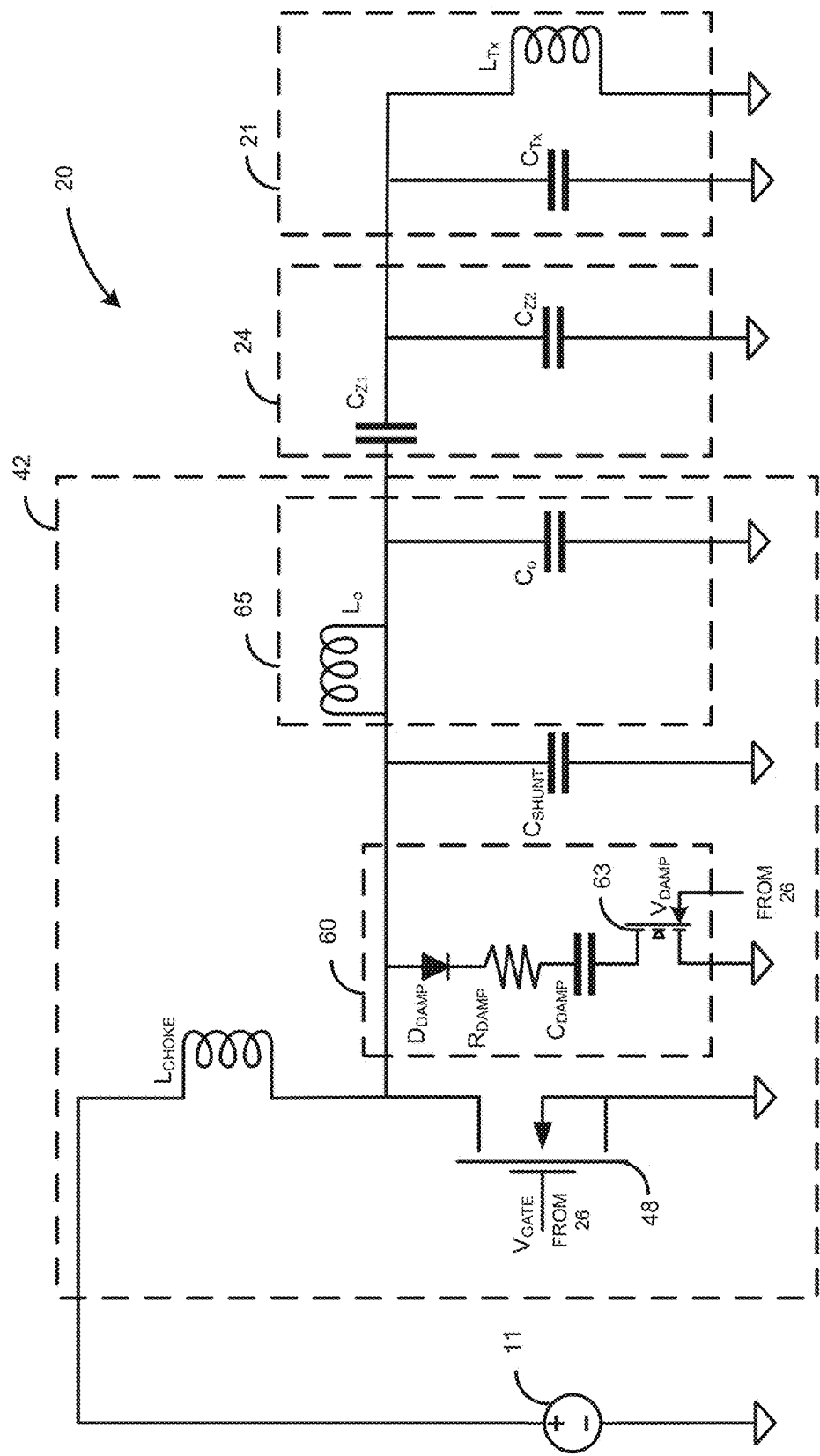
FIG. 7 is an electrical schematic diagram of elements of the wireless transmission system of FIGS. 1-6, further illustrating components of an amplifier of the power conditioning system of FIGS. 5-6, in accordance with FIGS. 1-6 and the present disclosure.

Turning now to FIGS. 6 and 7, the wireless transmission system 20 is illustrated, further detailing elements of the power conditioning system 40, the amplifier 42, the tuning system 24, among other things. The block diagram of the wireless transmission system 20 illustrates one or more electrical signals and the conditioning of such signals, altering of such signals, transforming of such signals, inverting of such signals, amplification of such signals, and combinations thereof. In FIG. 6, DC power signals are illustrated with heavily bolded lines, such that the lines are significantly thicker than other solid lines in FIG. 6 and other figures of the instant application, AC signals are illustrated as substantially sinusoidal wave forms with a thickness significantly less bolded than that of the DC power signal bolding, and data signals are represented as dotted lines. It is to be noted that the AC signals are not necessarily substantially sinusoidal waves and may be any AC waveform suitable for the purposes described below (e.g., a half sine wave, a square wave, a half square wave, among other waveforms). FIG. 7 illustrates sample electrical components for elements of the wireless transmission system, and sub-components thereof, in a simplified form. Note that FIG. 7 may represent one branch or sub-section of a schematic for the wireless transmission system 20 and/or components of the wireless transmission system 20 may be omitted from the schematic illustrated in FIG. 7 for clarity.

As illustrated in FIG. 6 and discussed above, the input power source 11 provides an input direct current voltage ($V_{DC}$), which may have its voltage level altered by the voltage regulator 46, prior to conditioning at the amplifier 42. In some examples, as illustrated in FIG. 7, the amplifier 42 may include a choke inductor $L_{CHOKE}$, which may be utilized to block radio frequency interference in $V_{DC}$, while allowing the DC power signal of $V_{DC}$ to continue towards an amplifier transistor 48 of the amplifier 42. $V_{CHOKE}$ may be configured as any suitable choke inductor known in the art.

The amplifier 48 is configured to alter and/or invert $V_{DC}$ to generate an AC wireless signal $V_{AC}$, which, as discussed in more detail below, may be configured to carry one or both of an inbound and outbound data signal (denoted as "Data" in FIG. 6). The amplifier transistor 48 may be any switching transistor known in the art that is capable of inverting, converting, and/or conditioning a DC power signal into an AC power signal, such as, but not limited to, a field-effect transistor (FET), gallium nitride (GaN) FETS, bipolar junction transistor (BJT), and/or wide-bandgap (WBG) semiconductor transistor, among other known switching transistors. The amplifier transistor 48 is configured to receive a driving signal (denoted as "PWM" in FIG. 6) from at a gate of the amplifier transistor 48 (denoted as "G" in FIG. 6) and invert the DC signal $V_{DC}$ to generate the AC wireless signal at an operating frequency and/or an operating frequency band for the wireless power transmission system 20. The driving signal may be a PWM signal configured for such inversion at the operating frequency and/or operating frequency band for the wireless power transmission system 20.

The driving signal is generated and output by the transmission control system 26 and/or the transmission controller 28 therein, as discussed and disclosed above. The transmission controller 26, 28 is configured to provide the driving signal and configured to perform one or more of encoding wireless data signals (denoted as "Data" in FIG. 6), decoding the wireless data signals (denoted as "Data" in FIG. 6) and any combinations thereof. In some examples, the electrical data signals may be in band signals of the AC wireless power signal. In some such examples, such in-band signals may be on-off-keying (OOK) signals in-band of the AC wireless power signals. For example, Type-A communications, as described in the NFC Standards, are a form of OOK, wherein the data signal is on-off-keyed in a carrier AC wireless power signal operating at an operating frequency in a range of about 13.553 MHz to about 13.567 MHz.

However, when the power, current, impedance, phase, and/or voltage levels of an AC power signal are changed beyond the levels used in current and/or legacy hardware for high frequency wireless power transfer (over about 500 mW transmitted), such legacy hardware may not be able to properly encode and/or decode in-band data signals with the required fidelity for communications functions. Such higher power in an AC output power signal may cause signal degradation due to increasing rise times for an OOK rise, increasing fall time for an OOK fall, overshooting the required voltage in an OOK rise, and/or undershooting the voltage in an OOK fall, among other potential degradations to the signal due to legacy hardware being ill equipped for higher power, high frequency wireless power transfer. Thus, there is a need for the amplifier 42 to be designed in a way that limits and/or substantially removes rise and fall times, overshoots, undershoots, and/or other signal deficiencies from an in-band data signal during wireless power transfer. This ability to limit and/or substantially remove such deficiencies allows for the systems of the instant application to provide higher power wireless power transfer in high frequency wireless power transmission systems.

Figure 8B:
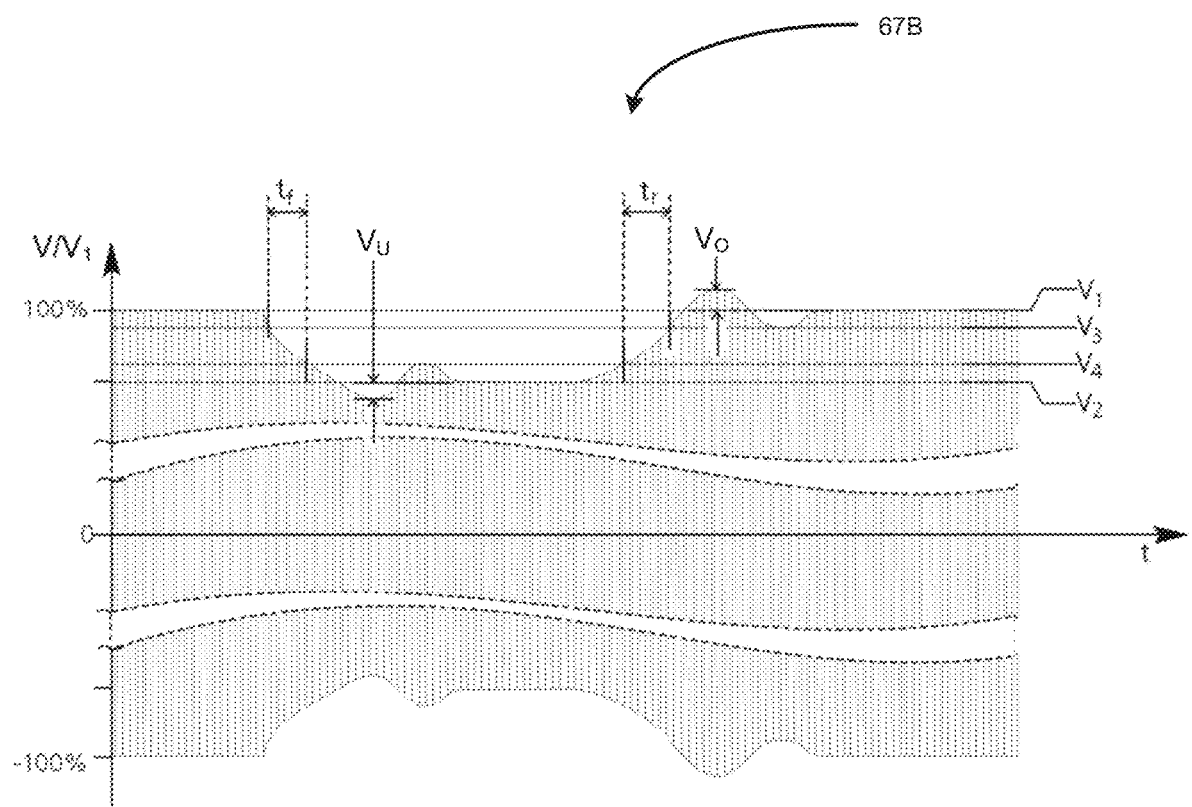
FIG. 8B is an exemplary plot illustrating rise and fall of "high" and "low" conditions when a signal has in-band communications via amplitude-shift keying.

For further exemplary illustration, FIG. 8 illustrates a plot for a fall and rise of an OOK in-band signal. The fall time ($t_1$) is shown as the time between when the signal is at 90% voltage ($V_4$) of the intended full voltage ($V_1$) and falls to about 5% voltage ($V_2$) of $V_1$. The rise time ($t_3$) is shown as the time between when the signal ends being at $V_2$ and rises to about $V_4$. Such rise and fall times may be read by a receiving antenna of the signal, and an applicable data communications protocol may include limits on rise and fall times, such that data is non-compliant and/or illegible by a receiver if rise and/or fall times exceed certain bounds.

Returning now to FIGS. 6 and 7, to achieve limitation and/or substantial removal of the mentioned deficiencies, the amplifier 42 includes a damping circuit 60. The damping circuit 60 is configured for damping the AC wireless signal during transmission of the AC wireless signal and associated data signals. The damping circuit 60 may be configured to reduce rise and fall times during OOK signal transmission, such that the rate of the data signals may not only be compliant and/or legible, but may also achieve faster data rates and/or enhanced data ranges, when compared to legacy systems. For damping the AC wireless power signal, the damping circuit includes, at least, a damping transistor 63, which is configured for receiving a damping signal ($V_{damp}$) from the transmission controller 62. The damping signal is configured for switching the damping transistor (on/off) to control damping of the AC wireless signal during the transmission and/or receipt of wireless data signals. Such transmission of the AC wireless signals may be performed by the transmission controller 28 and/or such transmission may be via transmission from the wireless receiver system 30, within the coupled magnetic field between the antennas 21, 31.

In examples wherein the data signals are conveyed via OOK, the damping signal may be substantially opposite and/or an inverse to the state of the data signals. This means that if the OOK data signals are in an "on" state, the damping signals instruct the damping transistor to turn "off" and thus the signal is not dissipated via the damping circuit 60 because the damping circuit is not set to ground and, thus, a short from the amplifier circuit and the current substantially bypasses the damping circuit 60. If the OOK data signals are in an "off" state, then the damping signals may be "on" and, thus, the damping transistor 63 is set to an "on" state and the current flowing of $V_{AC}$ is damped by the damping circuit. Thus, when "on," the damping circuit 60 may be configured to dissipate just enough power, current, and/or voltage, such that efficiency in the system is not substantially affected and such dissipation decreases rise and/or fall times in the OOK signal. Further, because the damping signal may instruct the damping transistor 63 to turn "off" when the OOK signal is "on," then it will not unnecessarily damp the signal, thus mitigating any efficiency losses from $V_{AC}$, when damping is not needed.

As illustrated in FIG. 7, the branch of the amplifier 42 which may include the damping circuit 60, is positioned at the output drain of the amplifier transistor 48. While it is not necessary that the damping circuit 60 be positioned here, in some examples, this may aid in properly damping the output AC wireless signal, as it will be able to damp at the node closest to the amplifier transistor 48 output drain, which is the first node in the circuit wherein energy dissipation is desired. In such examples, the damping circuit is in electrical parallel connection with a drain of the amplifier transistor 48. However, it is certainly possible that the damping circuit be connected proximate to the antenna 21, proximate to the transmission tuning system 24, and/or proximate to a filter circuit 24.

While the damping circuit 60 is capable of functioning to properly damp the AC wireless signal for proper communications at higher power high frequency wireless power transmission, in some examples, the damping circuit may include additional components. For instance, as illustrated, the damping circuit 60 may include one or more of a damping diode $D_{DAMP}$, a damping resistor $R_{DAMP}$, a damping capacitor $C_{DAMP}$, and/or any combinations thereof. $R_{DAMP}$ may be in electrical series with the damping transistor 63 and the value of $R_{DAMP}$ (ohms) may be configured such that it dissipates at least some power from the power signal, which may serve to accelerate rise and fall times in an amplitude shift keying signal, an OOK signal, and/or combinations thereof. In some examples, the value of $R_{DAMP}$ is selected, configured, and/or designed such that $R_{DAMP}$ dissipates the minimum amount of power to achieve the fastest rise and/or fall times in an in-band signal allowable and/or satisfy standards limitations for minimum rise and/or fall times; thereby achieving data fidelity at maximum efficiency (less power lost to $R_{DAMP}$) as well as maintaining data fidelity when the system is unloaded and/or under lightest load conditions.

$C_{DAMP}$ may also be in series connection with one or both of the damping transistor 63 and $R_{DAMP}$. $C_{DAMP}$ may be configured to smooth out transition points in an in-band signal and limit overshoot and/or undershoot conditions in such a signal. Further, in some examples, $C_{DAMP}$ may be configured for ensuring the damping performed is 180 degrees out of phase with the AC wireless power signal, when the transistor is activated via the damping signal.

$D_{DAMP}$ may further be included in series with one or more of the damping transistor 63, $R_{DAMP}$, $C_{DAMP}$, and/or any combinations thereof. $D_{DAMP}$ is positioned, as shown, such that a current cannot flow out of the damping circuit 60, when the damping transistor 63 is in an off state. The inclusion of $D_{DAMP}$ may prevent power efficiency loss in the AC power signal when the damping circuit is not active or "on." Indeed, while the damping transistor 63 is designed such that, in an ideal scenario, it serves to effectively short the damping circuit when in an "off" state, in practical terms, some current may still reach the damping circuit and/or some current may possibly flow in the opposite direction out of the damping circuit 60. Thus, inclusion of $D_{DAMP}$ may prevent such scenarios and only allow current, power, and/or voltage to be dissipated towards the damping transistor 63. This configuration, including $D_{DAMP}$, may be desirable when the damping circuit 60 is connected at the drain node of the amplifier transistor 48, as the signal may be a half-wave sine wave voltage and, thus, the voltage of $V_{AC}$ is always positive.

Beyond the damping circuit 60, the amplifier 42, in some examples, may include a shunt capacitor $C_{SHUNT}$. $C_{SHUNT}$ may be configured to shunt the AC power signal to ground and charge voltage of the AC power signal. Thus, $C_{SHUNT}$ may be configured to maintain an efficient and stable waveform for the AC power signal, such that a duty cycle of about 50% is maintained and/or such that the shape of the AC power signal is substantially sinusoidal at positive voltages.

In some examples, the amplifier 42 may include a filter circuit 65. The filter circuit 65 may be designed to mitigate and/or filter out electromagnetic interference (EMI) within the wireless transmission system 20. Design of the filter circuit 65 may be performed in view of impedance transfer and/or effects on the impedance transfer of the wireless power transmission 20 due to alterations in tuning made by the transmission tuning system 24. To that end, the filter circuit 65 may be or include one or more of a low pass filter, a high pass filter, and/or a band pass filter, among other filter circuits that are configured for, at least, mitigating EMI in a wireless power transmission system.

As illustrated, the filter circuit 65 may include a filter inductor $L_o$ and a filter capacitor $C_o$. The filter circuit 65 may have a complex impedance and, thus, a resistance through the filter circuit 65 may be defined as $R_o$. In some such examples, the filter circuit 65 may be designed and/or configured for optimization based on, at least, a filter quality factor $\gamma_{FILTER}$, defined as:

$$\gamma_{FILTER} = \frac{1}{R_o} \sqrt{\frac{L_o}{C_o}}.$$

In a filter circuit 65 wherein it includes or is embodied by a low pass filter, the cut-off frequency ($\omega_o$) of the low pass filter is defined as:

$$\omega_o = \frac{1}{\sqrt{L_o C_o}}.$$

In some wireless power transmission systems 20, it is desired that the cutoff frequency be about 1.03-1.4 times greater than the operating frequency of the antenna. Experimental results have determined that, in general, a larger $\gamma_{FILTER}$ may be preferred, because the larger $\gamma_{FILTER}$ can improve voltage gain and improve system voltage ripple and timing. Thus, the above values for $L_o$ and $C_o$ may be set such that $\gamma_{FILTER}$ can be optimized to its highest, ideal level (e.g., when the system 10 impedance is conjugately matched for maximum power transfer), given cutoff frequency restraints and available components for the values of $L_o$ and $C_o$.

As illustrated in FIG. 7, the conditioned signal(s) from the amplifier 42 is then received by the transmission tuning system 24, prior to transmission by the antenna 21. The transmission tuning system 24 may include tuning and/or impedance matching, filters (e.g. a low pass filter, a high pass filter, a "pi" or "Π" filter, a "T" filter, an "L" filter, a "LL" filter, and/or an L-C trap filter, among other filters), network matching, sensing, and/or conditioning elements configured to optimize wireless transfer of signals from the wireless transmission system 20 to the wireless receiver system 30. Further, the transmission tuning system 24 may include an impedance matching circuit, which is designed to match impedance with a corresponding wireless receiver system 30 for given power, current, and/or voltage requirements for wireless transmission of one or more of electrical energy, electrical power, electromagnetic energy, and electronic data. The illustrated transmission tuning system 24 includes, at least, $C_{Z1}$, $C_{Z2}$, and (operatively associated with the antenna 21) values, all of which may be configured for impedance matching in one or both of the wireless transmission system 20 and the broader system 10. It is noted that $C_{Tx}$ refers to the intrinsic capacitance of the antenna 21.

Figure 9A:
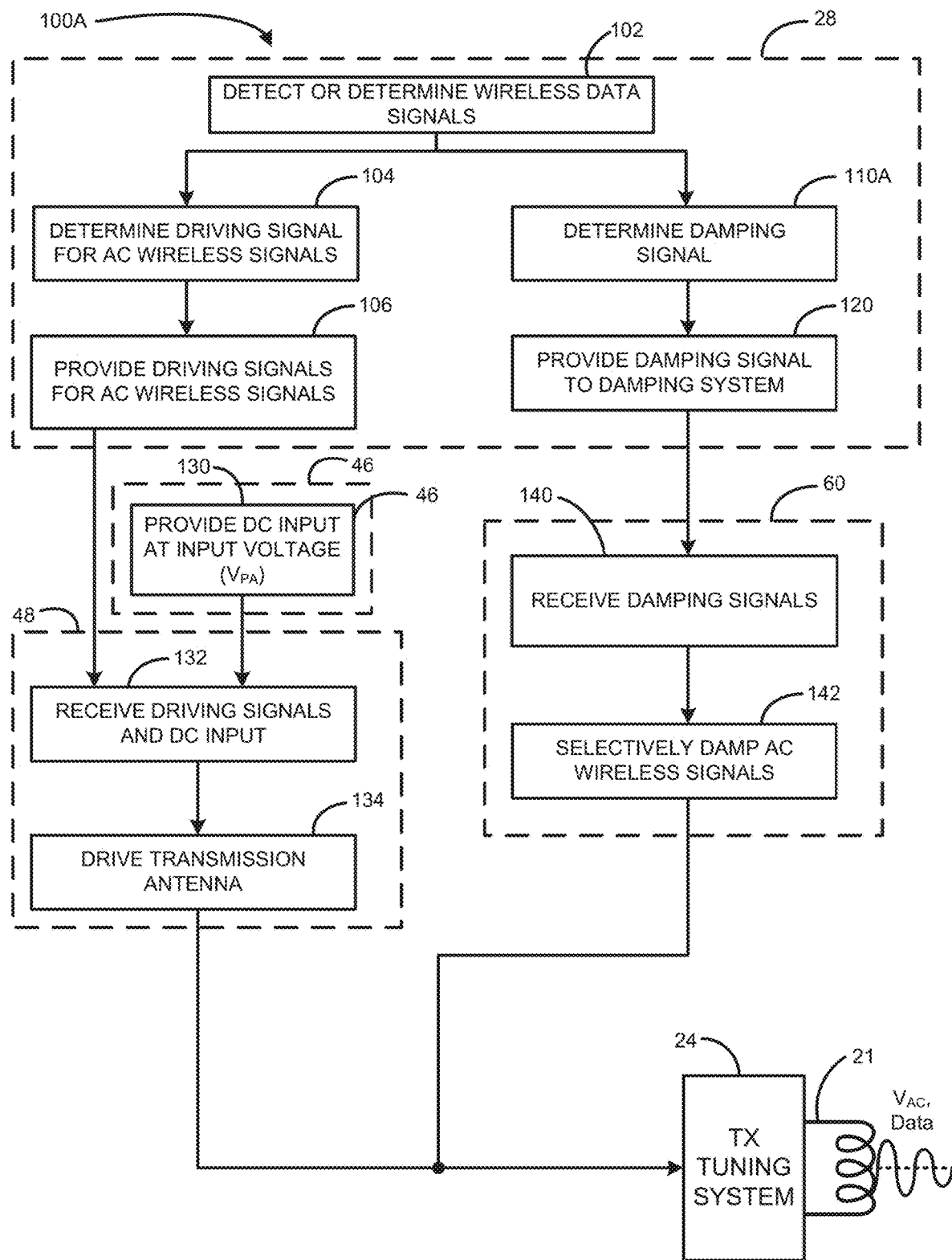
FIG. 9A is a flow chart for a method for operating the wireless transmission system of FIGS. 1-7, in accordance with FIGS. 1-7 and the present disclosure.

FIG. 9A is an exemplary method 100A for operating the wireless power transmitter 28, which utilizes, for example, the transmission controller, the voltage regulator 46, the amplifier transistor 48, the damping circuit 60, the transmission tuning system 24, and the transmission antenna 21. The method 100A may be performed using one or more of hardware of the transmission system 20, software executed by the transmission controller 28, or any combinations thereof.

The method begins at block 102, wherein the transmission controller 28 detects or determines wireless data signals. In examples wherein the transmission system 20 intends to transmit data to the wireless receiver system 30, the transmission controller 28 detects intent to transmit wireless data signals or knows it will transmit data signals, when the wireless data signals may be encoded into the driving signal by the transmission controller 28. Alternatively, if the wireless receiver system 30 is the transmitter of wireless data signals, the transmission controller determines that wireless data is transmitted by monitoring the voltage and/or current generated by the magnetic field between the antennas 21, 31 and detecting the signals that the wireless receiver system 30 has encoded into the field. For example, such signals may be encoded via the magnetic field when the wireless receiver system 30 selectively reduces one or both of a current or voltage generated by the magnetic field, during transmission by the transmission system 20. In some such examples, determining existence of the damping signals may be based, at least in part, using receiver quality factor information ($Q_{Rx}$) associated with the wireless receiver system 30. In some further examples, $Q_{Rx}$ may be received from or provided by, for example, the receiver sensing system 56.

At block 104, the method includes determining the driving signals for the AC wireless signals 104, as discussed above with respect to the transmission control system 24, and then providing the driving signals for the AC wireless signals to the amplifier transistor 48, as illustrated in block 106. Before, after, or, ideally, substantially simultaneously to performance of blocks 104, 106, respectively, the method 100A further includes determining the damping signals (110A) and providing the damping signals to the damping system 60 (block 120).

Figure 10A:
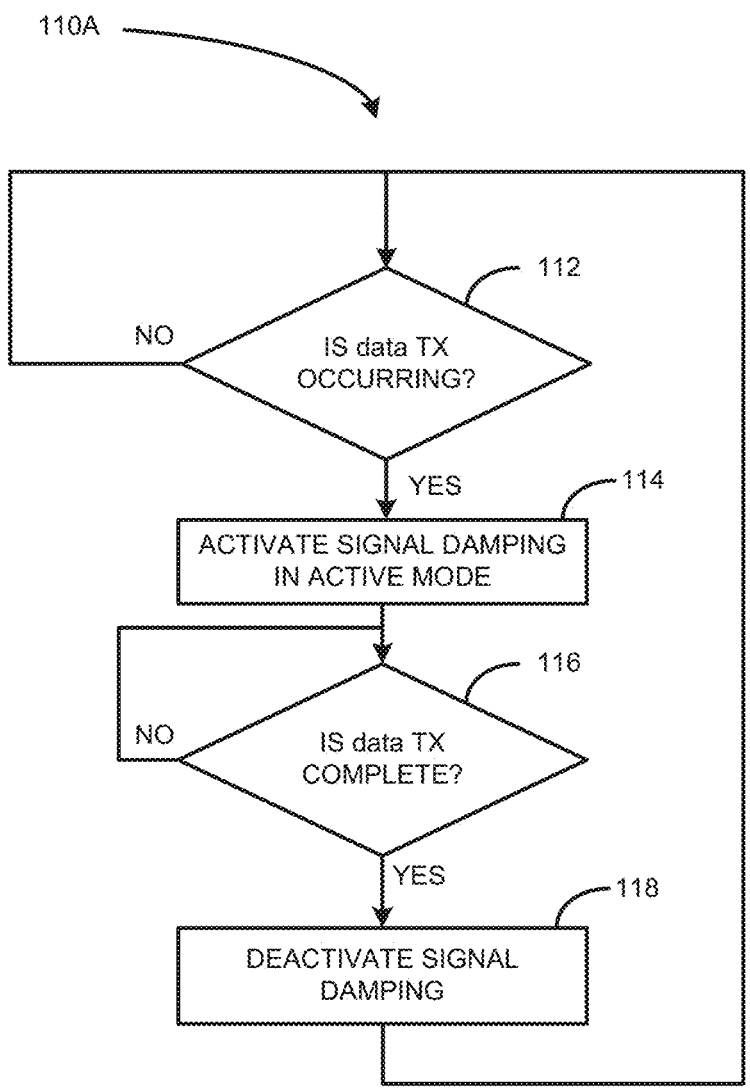
FIG. 10A is a flow chart for a sub-method for determining damping signals for the method of FIG. 9A, in accordance with FIGS. 1-7, 9A, and the present disclosure.

The step of block 110A is explained in greater detail, with reference to FIG. 10A. A sub-method for the step of block 110A is illustrated and begins by the transmission controller 28 determining if an incoming or outgoing data signal, of the AC wireless signals, is in a "low" (ASK/OOK) or "off" state (OOK), as illustrated at the decision 112. If the state of the data signals or a series of states of the data signals indicate the beginning or an in-process of transmission or receipt, then the transmission controller 28 will instruct the damping circuit to begin operation in an "active mode," as illustrated in block 114; otherwise, the block 110A will continue to monitor the data signal for indications of transmission or receipt of the data signals.

The "active mode" refers to a mode for operating the damping circuit 60 via, for example, damping signals output by the transmission controller 28. When the active mode is on, the damping signal instructs the damping circuit to remain "on," or, in other words, in a state such that the input to the damping transistor 63 allows for the damping system 60 to dissipate at least some power for damping the AC wireless signals. Damping of the AC wireless signal, during the active mode, is performed independent of the state ("on"/"off" or "high"/"low") of the data signals. Thus, the damping circuit 60 does not switch on and off during the active mode, in response to changes in state of the data signals.

If transmission of the data is complete, the damping signals will indicate that the damping circuit 60 should transition from the active mode to an inactive mode by proceeding to deactivate signal damping (block 118); otherwise, the sub-method of block 110A will continue to monitor whether or not the data signal has been fully transmitted or received, as illustrated by the decision 116.

Using the damping mode may provide for computational or operating simplicity, in comparison to switching the damping circuit 60 in response to changes in the state of the data signals. Thus, by utilizing the active mode operating mode, the computational resources utilized by the transmission controller 28 for the damping signal may be reduced and/or simplified. Further, by incorporating less switching of the damping transistor 63, the likelihood of unwanted noise or interference caused by physical components of the transmission system 20 to be reduced. Further, due to the reduction in switching, use of the active mode may enhance robustness of the system, by putting less stress on the damping transistor 63.

Figure 11A:
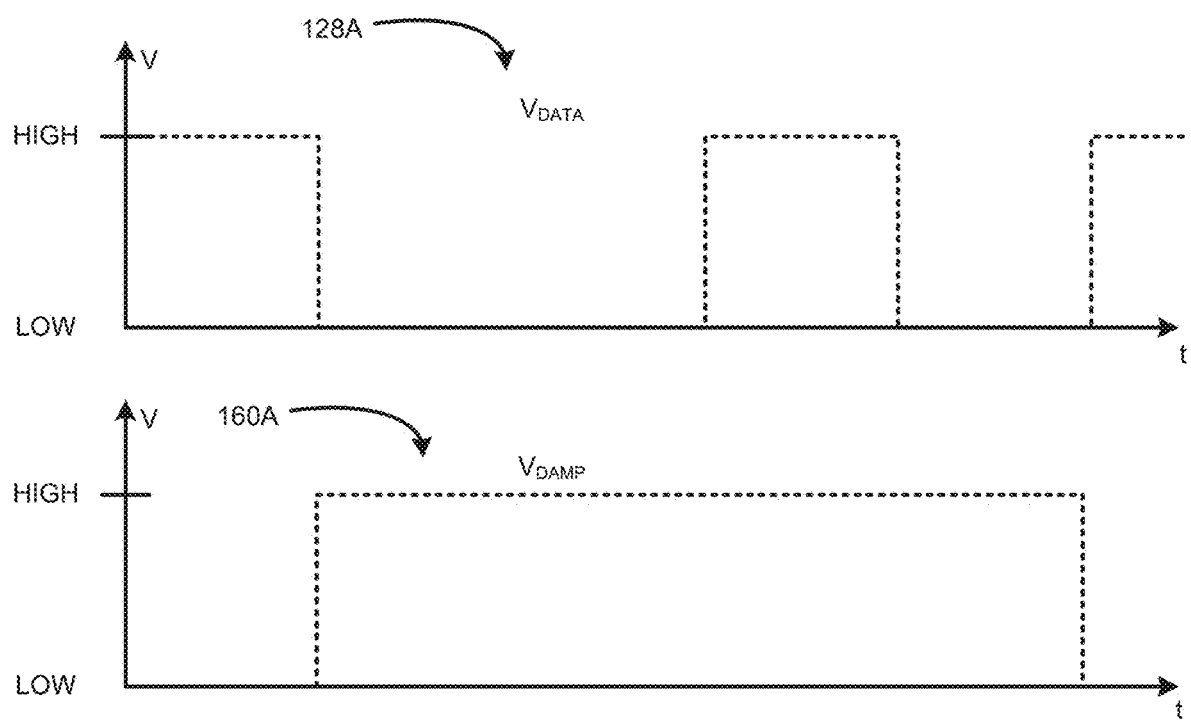
FIG. 11A illustrates exemplary timing diagrams for ideal data signals and damping signals output from the transmission controller of FIGS. 1-7, 9-10, when the data signal is encoded using on-off keying, in accordance with FIGS. 1-7, 9-10 and the present disclosure.
Figure 11B:
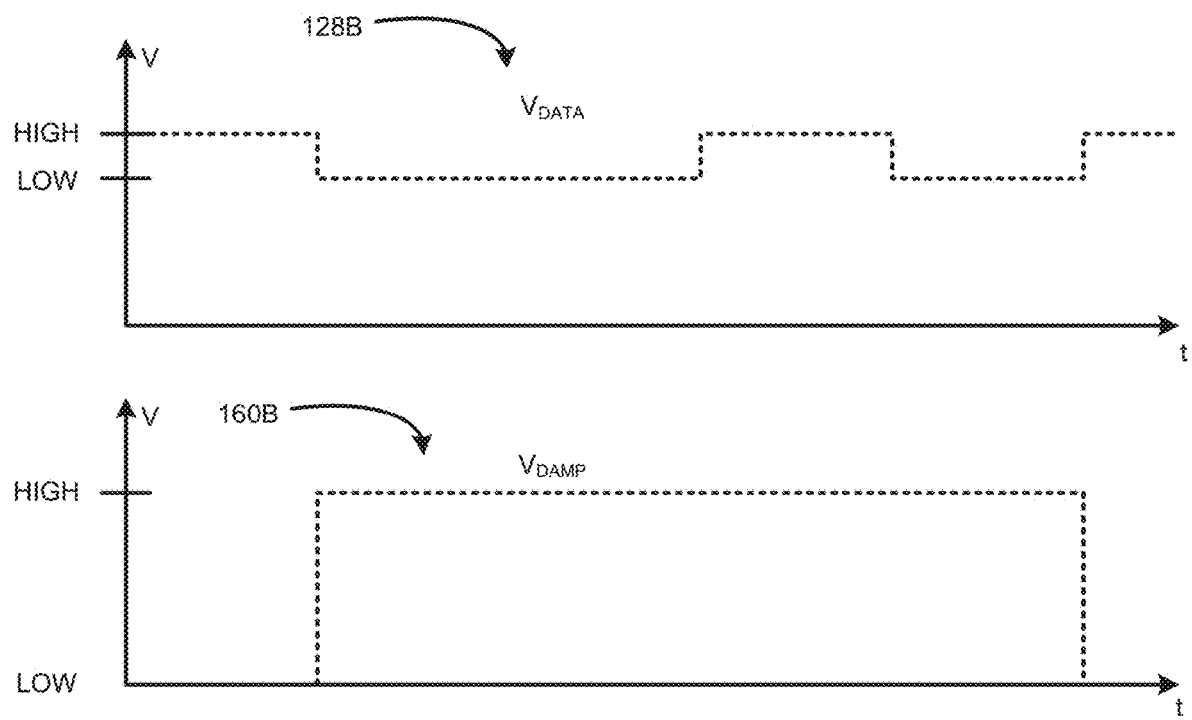
FIG. 11B illustrates exemplary timing diagrams for ideal data signals and damping signals output from the transmission controller of FIGS. 1-7, 9-10, when the data signal is encoded using amplitude shift keying, in accordance with FIGS. 1-7, 9-10 and the present disclosure.

The relationship between the data signals and the damping signals is illustrated in the timing diagrams of FIGS. 11A and 11B. FIG. 11A illustrates a first plot 128A for an example data signal ($V_{DATA}$) and a corresponding first plot 160A for a damping signal ($V_{DAMP}$) for output to the damping circuit 60, when $V_{DATA}$ is encoded via OOK and $V_{DATA}$ and $V_{DAMP}$ exist on an ideal, simultaneous time scale. Similarly, and containing the same data as the plots of FIG. 11A, FIG. 11B illustrates a second plot 128B for the example data signal $V_{DATA}$ and a corresponding second plot 160B for the damping signal $V_{DAMP}$, when $V_{DATA}$ is encoded via ASK and $V_{DATA}$ and $V_{DAMP}$ exist on an ideal, simultaneous time scale. As illustrated, particularly in FIG. 11A, the state of $V_{DAMP}$ may be in the "high" or "on" state, when the state of $V_{DATA}$ is repeatedly changing and, thus indicating that data is being either transmitted or received. This means that, during data transmission, whether $V_{DATA}$ is at a "high" or "on" state or at a "low" or "off" state, $V_{DAMP}$ will be at a "high" or "on" state and, thus, in the active mode. Thus, this known relationship between $V_{DAMP}$ and $V_{DATA}$ may be advantageous to reduce computational complexity for executing the generation and/or transmission of $V_{DAMP}$, based on timing of transmission of $V_{DATA}$. Note, that for the purposes of explanation, "on" and "high" may be used interchangeably to describe that a two-state signal is in a first state, whereas "off" or "low" may be used interchangeably to describe that the two-state signal is in a second state.

Figure 11C:
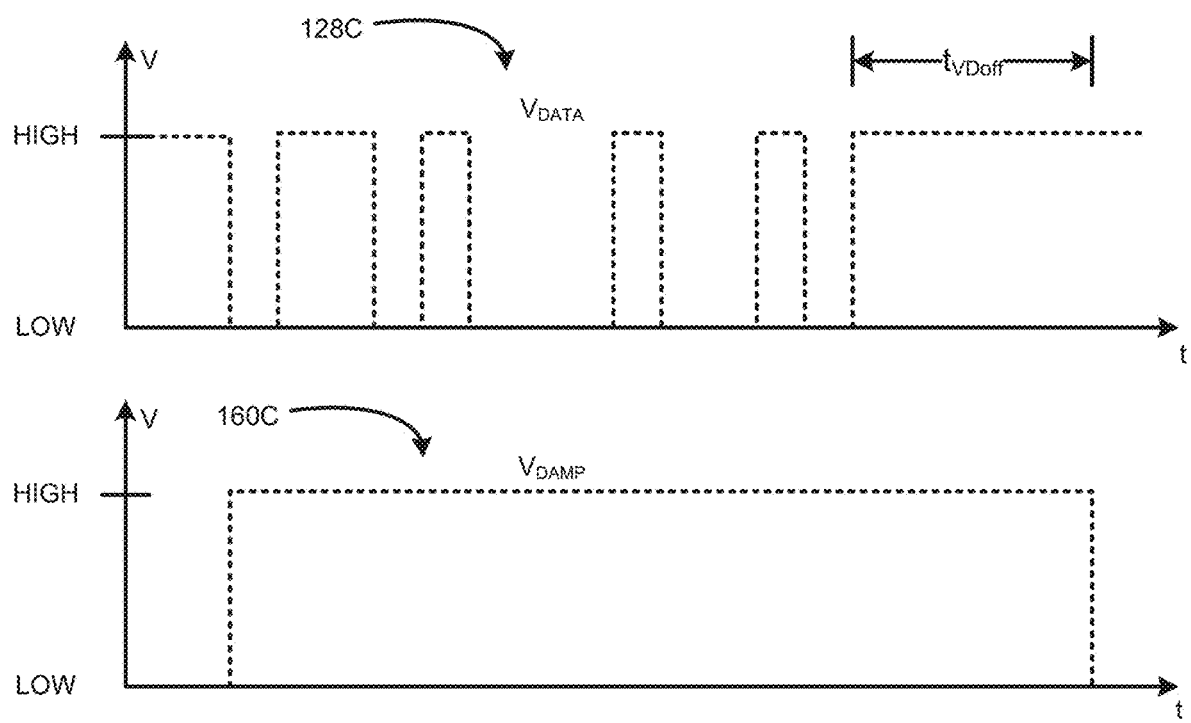
FIG. 11C illustrates another exemplary timing diagrams for ideal data signals and damping signals output from the transmission controller of FIGS. 1-7, 9-10, when the data signal is encoded using on-off keying, in accordance with FIGS. 1-7, 9-10 and the present disclosure.
Figure 11D:
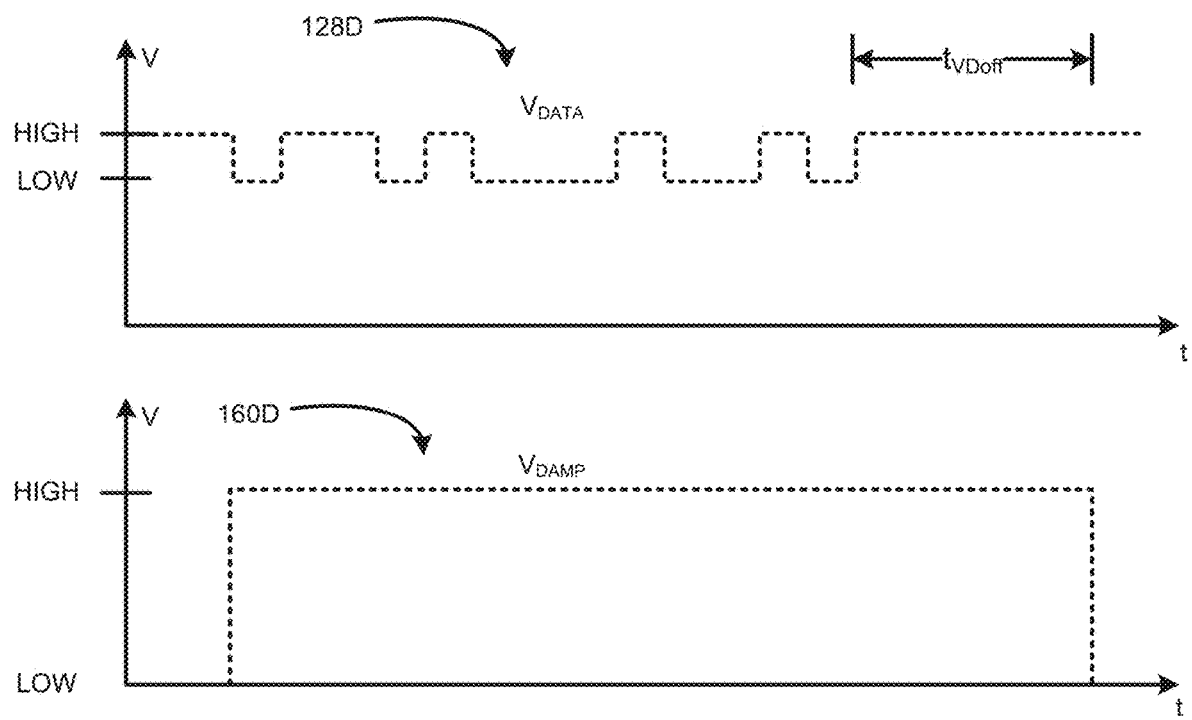
FIG. 11D illustrates another exemplary timing diagrams for ideal data signals and damping signals output from the transmission controller of FIGS. 1-7, 9-10, when the data signal is encoded using amplitude shift keying, in accordance with FIGS. 1-7, 9-10 and the present disclosure.

FIG. 11C illustrates a third plot 128C for an example data signal ($V_{DATA}$) and a corresponding third plot 160C for a damping signal ($V_{DAMP}$) for output to the damping circuit 60, when $V_{DATA}$ is encoded via OOK and $V_{DATA}$ and $V_{DAMP}$ exist on an ideal, simultaneous time scale. Similarly, and containing the same data as the plots of FIG. 11C, FIG. 11D illustrates a fourth plot 128D for the example data signal $V_{DATA}$ and a corresponding fourth plot 160D for the damping signal $V_{DAMP}$, when $V_{DATA}$ is encoded via ASK and $V_{DATA}$ and $V_{DAMP}$ exist on an ideal, simultaneous time scale. In some examples, the determination of when the data transmission ends, by the transmission controller 28 (block 116) may include monitoring a length of time that the wireless data signals have remained in the "high" or "on" state. If said length of time meets or exceeds a threshold of time ($t_{VDoff}$), which indicates that the transmission or receipt of the wireless signals has ended, then the transmission controller 28 decides that the transmission or receipt of data has ended. Thus, if a length of time that the data signal remains high meets or exceeds $t_{VDoff}$, the damping signals instruct the damping circuit to transition to the "low" or "off" state.

Figure 11E:
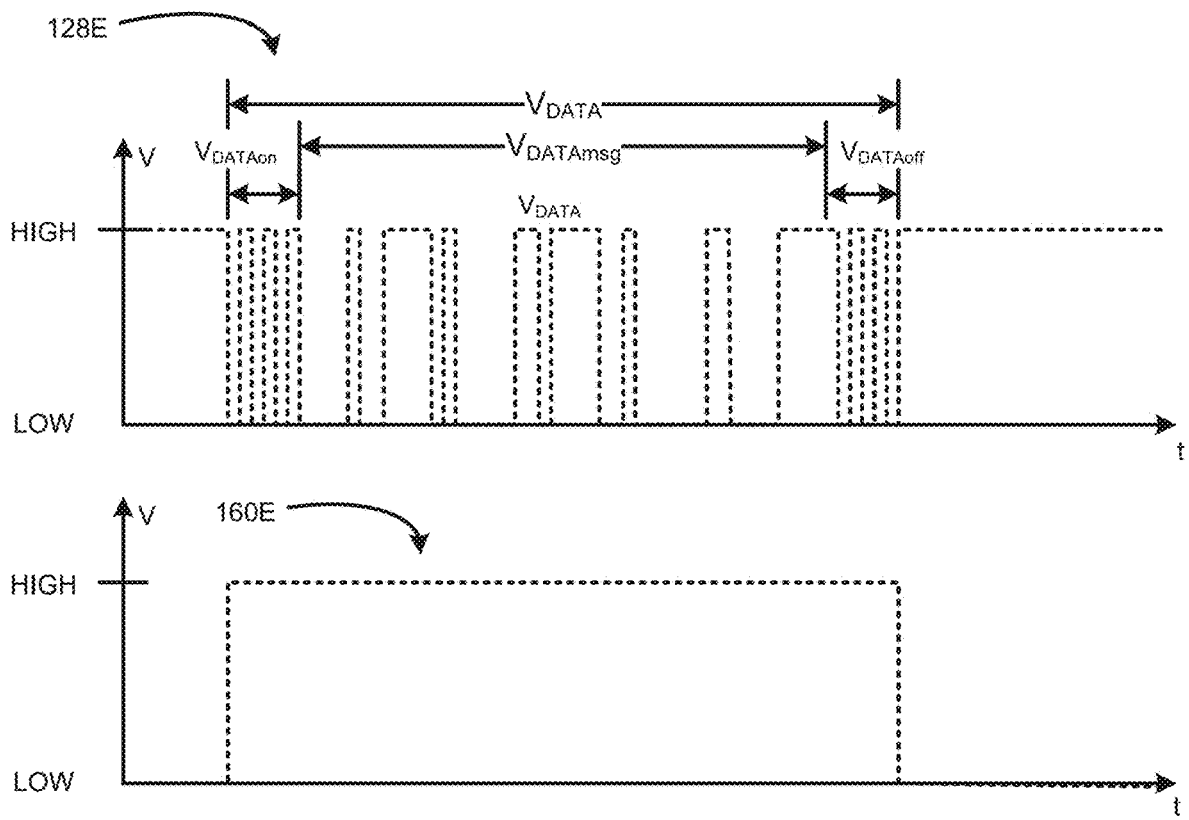
FIG. 11E illustrates another exemplary timing diagrams for ideal data signals and damping signals output from the transmission controller of FIGS. 1-7, 9-10, when the data signal is encoded using on-off keying, in accordance with FIGS. 1-7, 9-10 and the present disclosure.
Figure 11F:
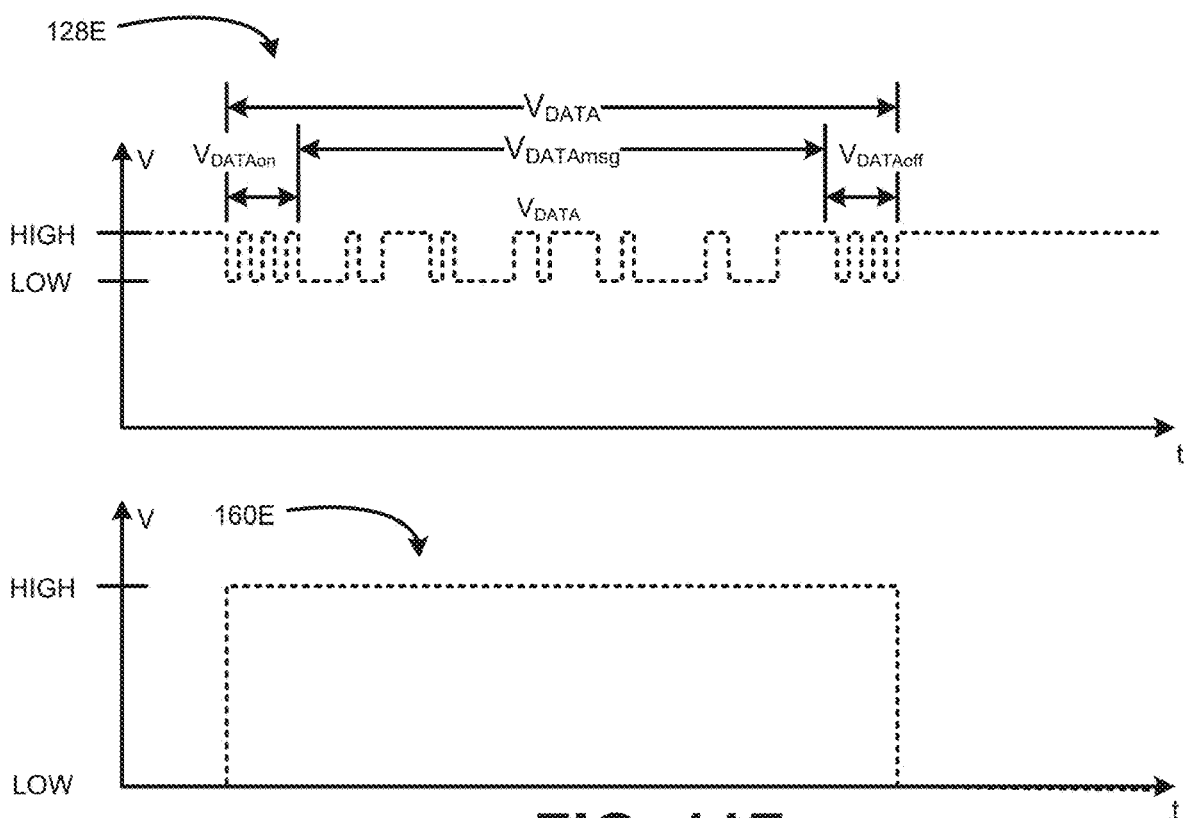
FIG. 11F illustrates another exemplary timing diagrams for ideal data signals and damping signals output from the transmission controller of FIGS. 1-7, 9-10, when the data signal is encoded using amplitude shift keying, in accordance with FIGS. 1-7, 9-10 and the present disclosure.

FIG. 11E illustrates a fifth plot 128E for an example data signal ($V_{DATA}$) and a corresponding fifth plot 160E for a damping signal ($V_{DAMP}$) for output to the damping circuit 60, when $V_{DATA}$ is encoded via OOK and $V_{DATA}$ and $V_{DAMP}$ exist on an ideal, simultaneous time scale. Similarly, and containing the same data as the plots of FIG. 11E, FIG. 11F illustrates a sixth plot 128F for the example data signal $V_{DATA}$ and a corresponding sixth plot 160F for the damping signal $V_{DAMP}$, when $V_{DATA}$ is encoded via ASK and $V_{DATA}$ and $V_{DAMP}$ exist on an ideal, simultaneous time scale. In some such examples, as illustrated in FIGS. 11E, 11F, $V_{DATA}$ may include a data message for transmission ($V_{DATAmsg}$) and may include one or both of an on-signal message ($V_{DATAon}$) and an off-signal message ($V_{DATAoff}$).

In some examples, $V_{DATAon}$, when read or written by the transmission controller 28, may indicate to the transmission controller that a data signal is being transmitted or received and, thus, the damping signal should be instructing the damping circuit 60 to be in the active mode. The damping signal may transition to the active mode upon the first "low" state of $V_{DATAon}$ (as illustrated) and remain on after verifying, once all of $V_{DATAon}$ is received, that the first "low" state of $V_{DATA}$ was intended as part of $V_{DATAon}$; otherwise, the active mode may cease if the first "low" state of $V_{DATA}$ is not part of $V_{DATAon}$. In some other examples, the damping signal may delay activation of the active mode, until $V_{DATAon}$ has been fully received and/or verified.

In some additional or alternative examples, $V_{DATAoff}$, when read or written by the transmission controller 28, may indicate to the transmission controller 28 that a data signal is ending transmission or receipt and, thus, the damping signal should be instructing the damping circuit to transition out of the active mode. In some such examples, $V_{DATAoff}$ may proceed or be appended to $V_{DATAmsg}$, within $V_{DATA}$.

In some examples, to detect transmission or receipt of the data signals, the transmission controller 28 may monitor for a moment at which the data signal transitions from the "high" (ASK/OOK) or "on" (OOK) state to the "low" or "off" state. When the data signal at the "low" or "off" state, the transmission controller 28 may then monitor the signal for a transition from the "low" or "off" state to the "high" or "on" state, as indicated by the decision 116. If the data signal remains "low" or "off" then the sub-method of block 110A loops back to the decision 116 and continues to monitor for a transition; however, when a transition from the "low" or "off" state to the "high" or "on" state is detected, then the transmission controller 28, via the damping signal, will deactivate the signal damping of the damping circuit 60, as illustrated in block 118. After deactivating the damping circuit 60, the sub-method of block 110A returns to decision 112, to monitor for a transition from the "high" or "on" state, to the "low" or "off" state.

Returning now to FIG. 9A, the method 100A proceeds to blocks 130, 132, 140. While some of blocks 130, 132, 140 may appear sequential, ideally, blocks 130, 132, 140 are performed simultaneously (with no disadvantage if block 130 is performed prior to blocks 132, 140), thus, the ordering of said blocks in FIG. 9A are not intended to show sequential performance. At block 130, the voltage regulator 46 provides the amplifier transistor 47 with a direct current (DC) input signal at an input voltage ($V_{P4}$). At block 132, the amplifier transmitter 48 receives the driving signals from the transmission controller 28 and receives $V_{P4}$ from the voltage regulator 46. At block 140, the damping circuit 60 and/or the damping transistor 63 thereof receives the damping signals. Based on the damping signals, the damping circuit 60 then selectively damps the AC wireless signals, prior to signal transmission of the AC wireless signals by the transmission antenna 21.

While blocks 132, 134 may appear to be performed at different times than blocks 140, 142, respectfully, in ideal conditions, block 130 and 140 are performed substantially simultaneously and blocks 134 and 142 are performed substantially simultaneously. "Substantially simultaneously" refers to ideal simultaneous performance but taking into account necessary delays in signal transmission/receipt due to tolerances of physical components.

Figure 9B:
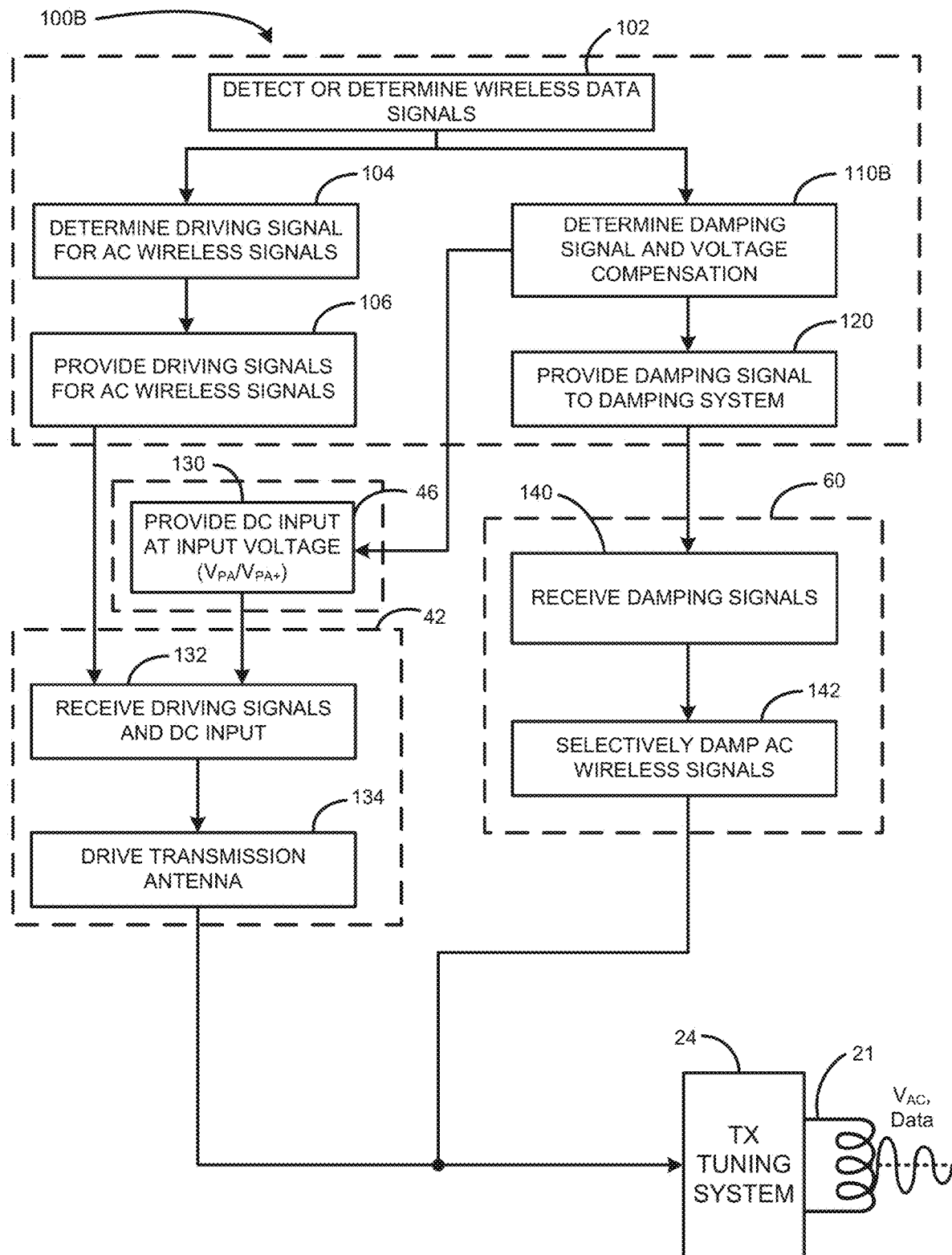
FIG. 9B is a flow chart for another method for operating the wireless transmission system of FIGS. 1-7, in accordance with FIGS. 1-7, 9A, and the present disclosure.

FIG. 9B is another method 100B for operating the wireless transmission system 20, including many similar and/or identical method steps or blocks, compared to the method 100A of FIG. 9A. To that end, the method 100B includes the same or similar blocks 102, 104, 106, 120, 132, 134, 140, and 142 of method 100A and, thus, the above descriptions thereof also are applicable to blocks 102, 104, 106, 120, 132, 134, 140, and 142 of the method 100B of FIG. 9B. However, blocks 110B and 130B include additional features, in comparison to blocks 110A, 110B.

Figure 10B:
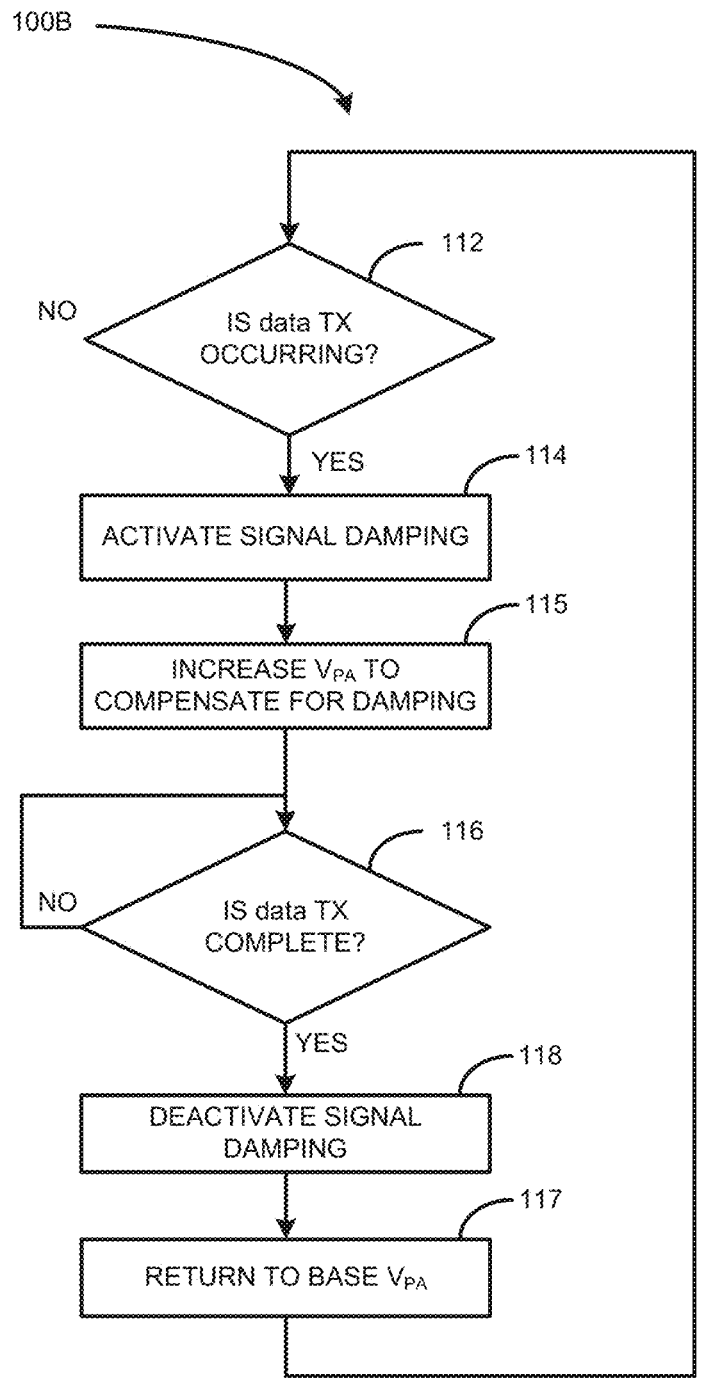
FIG. 10B is a flow chart for a sub-method for determining damping signals for the method of FIG. 9B, in accordance with FIGS. 1-7, 9A-B, 10A, and the present disclosure.

Block 110B, as best illustrated in the sub-method for block 110B of FIG. 10B, includes instructing the voltage regulator 46 to raise the input voltage ($V_{P4}$) to an elevated input voltage ($V_{P4+}$), when the damping circuit is activated. As illustrated in FIG. 10B, the sub-method for block 110B may further include instructing the voltage regulator 46 to increase $V_{P4}$ to $V_{P4+}$, when the damping signal is activated (block 115) and to reduce $V_{P4+}$, to return to $V_{P4}$, when the damping signal is deactivated (block 117). Similar to FIG. 9B, the sub-method for block 110B includes the same or similar blocks 112, 114, 116, 118 of the sub-method for block 110A and, thus, the above descriptions thereof also are applicable to blocks 112, 114, 116, 118 of FIG. 10B.

$V_{P4+}$ may be configured to compensate for the necessary power loss, in the AC wireless signal, that occurs when the signal is damped by the damping circuit 60. For example, $V_{P4+}$ may be configured to compensate for any resistance and/or impedance introduced by the damping circuit, when activated, into the signal path of the AC wireless signals, as its current flows through the wireless transmission system 20. Thus, by selectively raising $V_{P4}$ to $V_{P4+}$, the power output of the AC wireless signal may remain substantially consistent and/or more consistent compared to no changes in $V_{P4}$, over a given period of time.

Figure 12:
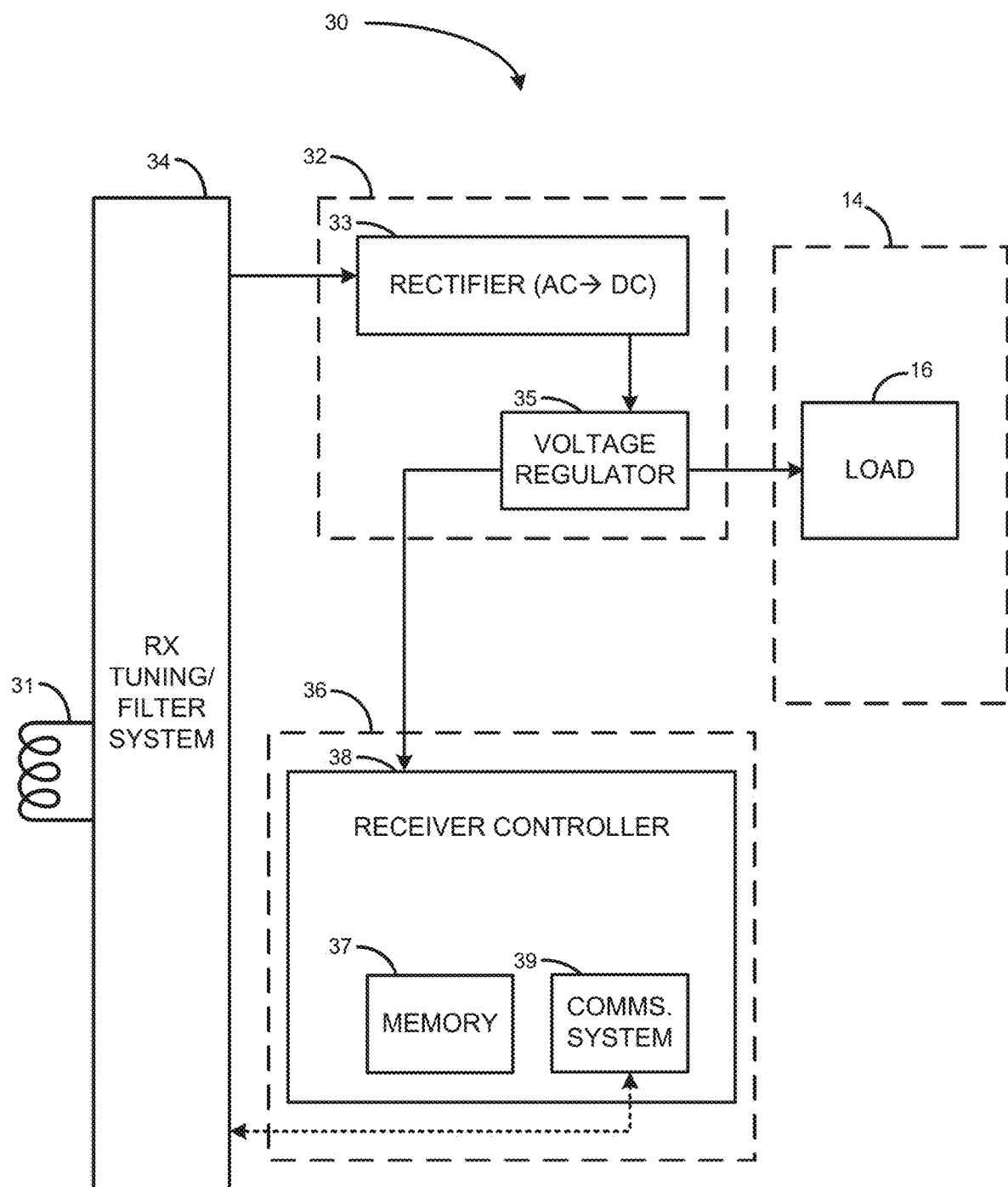
FIG. 12 is a block diagram illustrating components of a receiver control system and a receiver power conditioning system of the wireless receiver system of FIG. 2, in accordance with FIG. 1, FIG. 2, and the present disclosure.

Turning now to FIG. 12 and with continued reference to, at least, FIGS. 1 and 2, the wireless receiver system 30 is illustrated in further detail. The wireless receiver system 30 is configured to receive, at least, electrical energy, electrical power, electromagnetic energy, and/or electrically transmittable data via near field magnetic coupling from the wireless transmission system 20, via the transmission antenna 21. As illustrated in FIG. 9, the wireless receiver system 30 includes, at least, the receiver antenna 31, a receiver tuning and filtering system 34, a power conditioning system 32, a receiver control system 36, and a voltage isolation circuit 70. The receiver tuning and filtering system 34 may be configured to substantially match the electrical impedance of the wireless transmission system 20. In some examples, the receiver tuning and filtering system 34 may be configured to dynamically adjust and substantially match the electrical impedance of the receiver antenna 31 to a characteristic impedance of the power generator or the load at a driving frequency of the transmission antenna 20.

As illustrated, the power conditioning system 32 includes a rectifier 33 and a voltage regulator 35. In some examples, the rectifier 33 is in electrical connection with the receiver tuning and filtering system 34. The rectifier 33 is configured to modify the received electrical energy from an alternating current electrical energy signal to a direct current electrical energy signal. In some examples, the rectifier 33 is comprised of at least one diode. Some non-limiting example configurations for the rectifier 33 include, but are not limited to including, a full wave rectifier, including a center tapped full wave rectifier and a full wave rectifier with filter, a half wave rectifier, including a half wave rectifier with filter, a bridge rectifier, including a bridge rectifier with filter, a split supply rectifier, a single phase rectifier, a three phase rectifier, a voltage doubler, a synchronous voltage rectifier, a controlled rectifier, an uncontrolled rectifier, and a half controlled rectifier. As electronic devices may be sensitive to voltage, additional protection of the electronic device may be provided by clipper circuits or devices. In this respect, the rectifier 33 may further include a clipper circuit or a clipper device, which is a circuit or device that removes either the positive half (top half), the negative half (bottom half), or both the positive and the negative halves of an input AC signal. In other words, a clipper is a circuit or device that limits the positive amplitude, the negative amplitude, or both the positive and the negative amplitudes of the input AC signal.

Some non-limiting examples of a voltage regulator 35 include, but are not limited to, including a series linear voltage regulator, a buck convertor, a low dropout (LDO) regulator, a shunt linear voltage regulator, a step up switching voltage regulator, a step down switching voltage regulator, an invertor voltage regulator, a Zener controlled transistor series voltage regulator, a charge pump regulator, and an emitter follower voltage regulator. The voltage regulator 35 may further include a voltage multiplier, which is as an electronic circuit or device that delivers an output voltage having an amplitude (peak value) that is two, three, or more times greater than the amplitude (peak value) of the input voltage. The voltage regulator 35 is in electrical connection with the rectifier 33 and configured to adjust the amplitude of the electrical voltage of the wirelessly received electrical energy signal, after conversion to AC by the rectifier 33. In some examples, the voltage regulator 35 may an LDO linear voltage regulator; however, other voltage regulation circuits and/or systems are contemplated. As illustrated, the direct current electrical energy signal output by the voltage regulator 35 is received at the load 16 of the electronic device 14. In some examples, a portion of the direct current electrical power signal may be utilized to power the receiver control system 36 and any components thereof; however, it is certainly possible that the receiver control system 36, and any components thereof, may be powered and/or receive signals from the load 16 (e.g., when the load 16 is a battery and/or other power source) and/or other components of the electronic device 14.

The receiver control system 36 may include, but is not limited to including, a receiver controller 38, a communications system 39 and a memory 37. The receiver controller 38 may be any electronic controller or computing system that includes, at least, a processor which performs operations, executes control algorithms, stores data, retrieves data, gathers data, controls and/or provides communication with other components and/or subsystems associated with the wireless receiver system 30. The receiver controller 38 may be a single controller or may include more than one controller disposed to control various functions and/or features of the wireless receiver system 30. Functionality of the receiver controller 38 may be implemented in hardware and/or software and may rely on one or more data maps relating to the operation of the wireless receiver system 30. To that end, the receiver controller 38 may be operatively associated with the memory 37. The memory may include one or both of internal memory, external memory, and/or remote memory (e.g., a database and/or server operatively connected to the receiver controller 38 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory computer readable memory media.

Further, while particular elements of the receiver control system 36 are illustrated as subcomponents and/or circuits (e.g., the memory 37, the communications system 39, among other contemplated elements) of the receiver control system 36, such components may be external of the receiver controller 38. In some examples, the receiver controller 38 may be and/or include one or more integrated circuits configured to include functional elements of one or both of the receiver controller 38 and the wireless receiver system 30, generally. As used herein, the term "integrated circuits" generally refers to a circuit in which all or some of the circuit elements are inseparably associated and electrically interconnected so that it is considered to be indivisible for the purposes of construction and commerce. Such integrated circuits may include, but are not limited to including, thin-film transistors, thick-film technologies, and/or hybrid integrated circuits.

In some examples, the receiver controller 38 may be a dedicated circuit configured to send and receive data at a given operating frequency. For example, the receiver controller 38 may be a tagging or identifier integrated circuit, such as, but not limited to, an NFC tag and/or labelling integrated circuit. Examples of such NFC tags and/or labelling integrated circuits include the NTAG® family of integrated circuits manufactured by NXP Semiconductors N.V. However, the communications system 39 is certainly not limited to these example components and, in some examples, the communications system 39 may be implemented with another integrated circuit (e.g., integrated with the receiver controller 38), and/or may be another transceiver of or operatively associated with one or both of the electronic device 14 and the wireless receiver system 30, among other contemplated communication systems and/or apparatus. Further, in some examples, functions of the communications system 39 may be integrated with the receiver controller 38, such that the controller modifies the inductive field between the antennas 21, 31 to communicate in the frequency band of wireless power transfer operating frequency.

Figure 13:
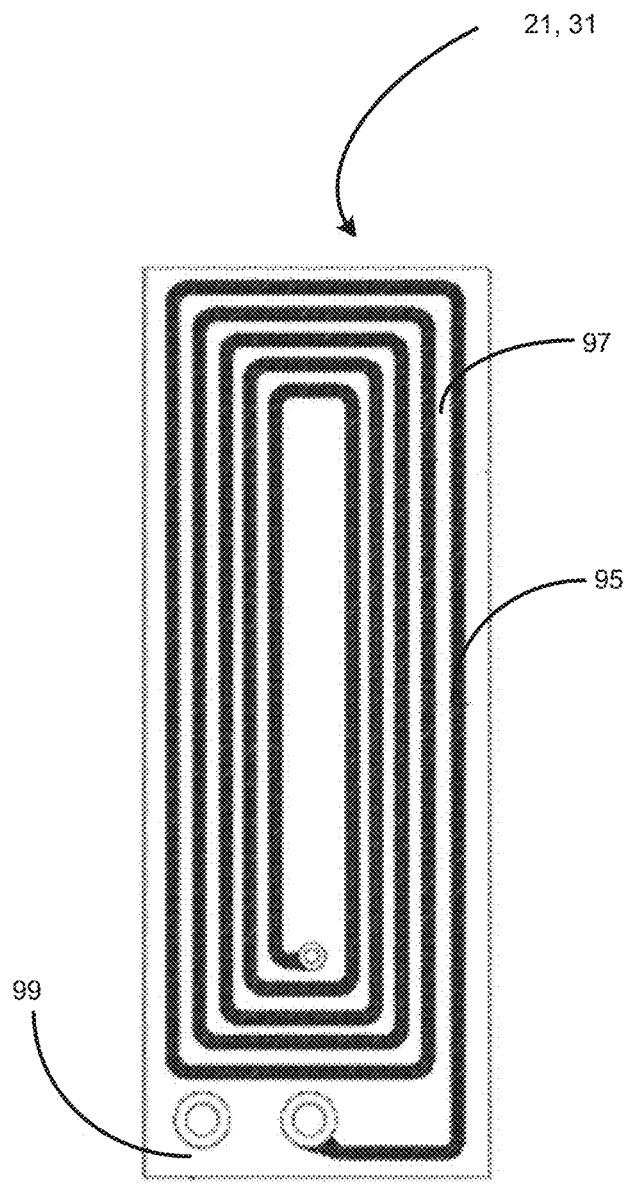
FIG. 13 is a top view of a non-limiting, exemplary antenna, for use as one or both of a transmission antenna and a receiver antenna of the system of FIGS. 1-7, 9-10 and/or any other systems, methods, or apparatus disclosed herein, in accordance with the present disclosure.

FIG. 13 illustrates an example, non-limiting embodiment of one or more of the transmission antenna 21 and the receiver antenna 31 that may be used with any of the systems, methods, and/or apparatus disclosed herein. In the illustrated embodiment, the antenna 21, 31, is a flat spiral coil configuration. Non-limiting examples can be found in U.S. Pat. Nos. 9,941,743, 9,960,628, 9,941,743 all to Peralta et al.; 9,948,129, 10,063,100 to Singh et al.; U.S. Pat. No. 9,941,590 to Luzinski; U.S. Pat. No. 9,960,629 to Rajagopalan et al.; and U.S. Patent App. Nos. 2017/0040107, 2017/0040105, 2017/0040688 to Peralta et al.; all of which are assigned to the assignee of the present application and incorporated fully herein by reference.

In addition, the antenna 21, 31 may be constructed having a multi-layer-multi-turn (MLMT) construction in which at least one insulator is positioned between a plurality of conductors. Non-limiting examples of antennas having an MLMT construction that may be incorporated within the wireless transmission system(s) 20 and/or the wireless receiver system(s) 30 may be found in U.S. Pat. Nos. 8,610,530, 8,653,927, 8,680,960, 8,692,641, 8,692,642, 8,698,590, 8,698,591, 8,707,546, 8,710,948, 8,803,649, 8,823,481, 8,823,482, 8,855,786, 8,898,885, 9,208,942, 9,232,893, and 9,300,046 to Singh et al., all of which are assigned to the assignee of the present application are incorporated fully herein. These are merely exemplary antenna examples; however, it is contemplated that the antennas 21, 31 may be any antenna capable of the aforementioned higher power, high frequency wireless power transfer.

FIG. 14 is an example block diagram for a method 1000 of designing a system for wirelessly transferring one or more of electrical energy, electrical power, electromagnetic energy, and electronic data, in accordance with the systems, methods, and apparatus of the present disclosure. To that end, the method 1000 may be utilized to design a system in accordance with any disclosed embodiments of the system 10 and any components thereof.

At block 1200, the method 1000 includes designing a wireless transmission system for use in the system 10. The wireless transmission system designed at block 1200 may be designed in accordance with one or more of the aforementioned and disclosed embodiments of the wireless transmission system 20, in whole or in part and, optionally, including any components thereof. Block 1200 may be implemented as a method 1200 for designing a wireless transmission system.

Turning now to FIG. 15 and with continued reference to the method 1000 of FIG. 14, an example block diagram for the method 1200 for designing a wireless transmission system is illustrated. The wireless transmission system designed by the method 1200 may be designed in accordance with one or more of the aforementioned and disclosed embodiments of the wireless transmission system 20 in whole or in part and, optionally, including any components thereof. The method 1200 includes designing and/or selecting a transmission antenna for the wireless transmission system, as illustrated in block 1210. The designed and/or selected transmission antenna may be designed and/or selected in accordance with one or more of the aforementioned and disclosed embodiments of the transmission antenna 21, in whole or in part and including any components thereof. The method 1200 also includes designing and/or tuning a transmission tuning system for the wireless transmission system, as illustrated in block 1220. Such designing and/or tuning may be utilized for, but not limited to being utilized for, impedance matching, as discussed in more detail above. The designed and/or tuned transmission tuning system may be designed and/or tuned in accordance with one or more of the aforementioned and disclosed embodiments of wireless transmission system 20, in whole or in part and, optionally, including any components thereof.

The method 1200 further includes designing a power conditioning system for the wireless transmission system, as illustrated in block 1230. The power conditioning system designed may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 40, in whole or in part and, optionally, including any components thereof. Further, at block 1240, the method 1200 may involve determining and/or optimizing a connection, and any associated connection components, between the input power source 12 and the power conditioning system that is designed at block 1230. Such determining and/or optimizing may include selecting and implementing protection mechanisms and/or apparatus, selecting and/or implementing voltage protection mechanisms, among other things.

The method 1200 further includes designing and/or programing a transmission control system of the wireless transmission system of the method 1000, as illustrated in block 1250. The designed transmission control system may be designed in accordance with one or more of the aforementioned and disclosed embodiments of the transmission control system 26, in whole or in part and, optionally, including any components thereof. Such components thereof include, but are not limited to including, the sensing system 50, the driver 41, the transmission controller 28, the memory 27, the communications system 29, the thermal sensing system 52, the object sensing system 54, the receiver sensing system 56, the other sensor(s) 58, the gate voltage regulator 43, the PWM generator 41, the frequency generator 348, in whole or in part and, optionally, including any components thereof.

Returning now to FIG. 14, at block 1300, the method 1000 includes designing a wireless receiver system for use in the system 10. The wireless transmission system designed at block 1300 may be designed in accordance with one or more of the aforementioned and disclosed embodiments of the wireless receiver system 30 in whole or in part and, optionally, including any components thereof. Block 1300 may be implemented as a method 1300 for designing a wireless receiver system.

Turning now to FIG. 16 and with continued reference to the method 1000 of FIG. 14, an example block diagram for the method 1300 for designing a wireless receiver system is illustrated. The wireless receiver system designed by the method 1300 may be designed in accordance with one or more of the aforementioned and disclosed embodiments of the wireless receiver system 30 in whole or in part and, optionally, including any components thereof. The method 1300 includes designing and/or selecting a receiver antenna for the wireless receiver system, as illustrated in block 1310. The designed and/or selected receiver antenna may be designed and/or selected in accordance with one or more of the aforementioned and disclosed embodiments of the receiver antenna 31, in whole or in part and including any components thereof. The method 1300 includes designing and/or tuning a receiver tuning system for the wireless receiver system, as illustrated in block 1320. Such designing and/or tuning may be utilized for, but not limited to being utilized for, impedance matching, as discussed in more detail above. The designed and/or tuned receiver tuning system may be designed and/or tuned in accordance with one or more of the aforementioned and disclosed embodiments of the receiver tuning and filtering system 34 in whole or in part and/or, optionally, including any components thereof.

The method 1300 further includes designing a power conditioning system for the wireless receiver system, as illustrated in block 1330. The power conditioning system may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 32 in whole or in part and, optionally, including any components thereof. Further, at block 1340, the method 1300 may involve determining and/or optimizing a connection, and any associated connection components, between the load 16 and the power conditioning system of block 1330. Such determining may include selecting and implementing protection mechanisms and/or apparatus, selecting and/or implementing voltage protection mechanisms, among other things.

The method 1300 further includes designing and/or programing a receiver control system of the wireless receiver system of the method 1300, as illustrated in block 1350. The designed receiver control system may be designed in accordance with one or more of the aforementioned and disclosed embodiments of the receiver control system 36 in whole or in part and, optionally, including any components thereof. Such components thereof include, but are not limited to including, the receiver controller 38, the memory 37, and the communications system 39, in whole or in part and, optionally, including any components thereof.

Returning now to the method 1000 of FIG. 14, the method 1000 further includes, at block 1400, optimizing and/or tuning both the wireless transmission system and the wireless receiver system for wireless power transfer. Such optimizing and/or tuning includes, but is not limited to including, controlling and/or tuning parameters of system components to match impedance, optimize and/or set voltage and/or power levels of an output power signal, among other things and in accordance with any of the disclosed systems, methods, and apparatus herein. Further, the method 1000 includes optimizing and/or tuning one or both of the wireless transmission system and the wireless receiver system for data communications, in view of system characteristics necessary for wireless power transfer. Such optimizing and/or tuning includes, but is not limited to including, optimizing power characteristics for concurrent transmission of electrical power signals and electrical data signals, tuning quality factors of antennas for different transmission schemes, among other things and in accordance with any of the disclosed systems, methods, and apparatus herein.

FIG. 17 is an example block diagram for a method 2000 for manufacturing a system for wirelessly transferring one or both of electrical power signals and electrical data signals, in accordance with the systems, methods, and apparatus of the present disclosure. To that end, the method 2000 may be utilized to manufacture a system in accordance with any disclosed embodiments of the system 10 and any components thereof.

At block 2200, the method 2000 includes manufacturing a wireless transmission system for use in the system 10. The wireless transmission system manufactured at block 2200 may be designed in accordance with one or more of the aforementioned and disclosed embodiments of the wireless transmission system 20 in whole or in part and, optionally, including any components thereof. Block 2200 may be implemented as a method 2200 for manufacturing a wireless transmission system.

Turning now to FIG. 18 and with continued reference to the method 2000 of FIG. 17, an example block diagram for the method 2200 for manufacturing a wireless transmission system is illustrated. The wireless transmission system manufactured by the method 2200 may be manufactured in accordance with one or more of the aforementioned and disclosed embodiments of the wireless transmission system 20 in whole or in part and, optionally, including any components thereof. The method 2200 includes manufacturing a transmission antenna for the wireless transmission system, as illustrated in block 2210. The manufactured transmission system may be built and/or tuned in accordance with one or more of the aforementioned and disclosed embodiments of the transmission antenna 21, in whole or in part and including any components thereof. The method 2200 also includes building and/or tuning a transmission tuning system for the wireless transmission system, as illustrated in block 2220. Such building and/or tuning may be utilized for, but not limited to being utilized for, impedance matching, as discussed in more detail above. The built and/or tuned transmission tuning system may be designed and/or tuned in accordance with one or more of the aforementioned and disclosed embodiments of the transmission tuning system 24, in whole or in part and, optionally, including any components thereof.

The method 2200 further includes selecting and/or connecting a power conditioning system for the wireless transmission system, as illustrated in block 2230. The power conditioning system manufactured may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 40 in whole or in part and, optionally, including any components thereof. Further, at block 2240, the method 2200 involve determining and/or optimizing a connection, and any associated connection components, between the input power source 12 and the power conditioning system of block 2230. Such determining may include selecting and implementing protection mechanisms and/or apparatus, selecting and/or implementing voltage protection mechanisms, among other things.

The method 2200 further includes assembling and/or programing a transmission control system of the wireless transmission system of the method 2000, as illustrated in block 2250. The assembled transmission control system may be assembled and/or programmed in accordance with one or more of the aforementioned and disclosed embodiments of the transmission control system 26 in whole or in part and, optionally, including any components thereof. Such components thereof include, but are not limited to including, the sensing system 50, the driver 41, the transmission controller 28, the memory 27, the communications system 29, the thermal sensing system 52, the object sensing system 54, the receiver sensing system 56, the other sensor(s) 58, the gate voltage regulator 43, the PWM generator 41, the frequency generator 348, in whole or in part and, optionally, including any components thereof.

Returning now to FIG. 17, at block 2300, the method 2000 includes manufacturing a wireless receiver system for use in the system 10. The wireless transmission system manufactured at block 2300 may be designed in accordance with one or more of the aforementioned and disclosed embodiments of the wireless receiver system 30 in whole or in part and, optionally, including any components thereof. Block 2300 may be implemented as a method 2300 for manufacturing a wireless receiver system.

Turning now to FIG. 19 and with continued reference to the method 2000 of FIG. 17, an example block diagram for the method 2300 for manufacturing a wireless receiver system is illustrated. The wireless receiver system manufactured by the method 2300 may be designed in accordance with one or more of the aforementioned and disclosed embodiments of the wireless receiver system 30 in whole or in part and, optionally, including any components thereof. The method 2300 includes manufacturing a receiver antenna for the wireless receiver system, as illustrated in block 2310. The manufactured receiver antenna may be manufactured, designed, and/or selected in accordance with one or more of the aforementioned and disclosed embodiments of the receiver antenna 31 in whole or in part and including any components thereof. The method 2300 includes building and/or tuning a receiver tuning system for the wireless receiver system, as illustrated in block 2320. Such building and/or tuning may be utilized for, but not limited to being utilized for, impedance matching, as discussed in more detail above. The built and/or tuned receiver tuning system may be designed and/or tuned in accordance with one or more of the aforementioned and disclosed embodiments of the receiver tuning and filtering system 34 in whole or in part and, optionally, including any components thereof.

The method 2300 further includes selecting and/or connecting a power conditioning system for the wireless receiver system, as illustrated in block 2330. The power conditioning system designed may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 32 in whole or in part and, optionally, including any components thereof. Further, at block 2340, the method 2300 may involve determining and/or optimizing a connection, and any associated connection components, between the load 16 and the power conditioning system of block 2330. Such determining may include selecting and implementing protection mechanisms and/or apparatus, selecting and/or implementing voltage protection mechanisms, among other things.

The method 2300 further includes assembling and/or programing a receiver control system of the wireless receiver system of the method 2300, as illustrated in block 2350. The assembled receiver control system may be designed in accordance with one or more of the aforementioned and disclosed embodiments of the receiver control system 36 in whole or in part and, optionally, including any components thereof. Such components thereof include, but are not limited to including, the receiver controller 38, the memory 37, and the communications system 39, in whole or in part and, optionally, including any components thereof.

Returning now to the method 2000 of FIG. 17, the method 2000 further includes, at block 2400, optimizing and/or tuning both the wireless transmission system and the wireless receiver system for wireless power transfer. Such optimizing and/or tuning includes, but is not limited to including, controlling and/or tuning parameters of system components to match impedance, optimize and/or configure voltage and/or power levels of an output power signal, among other things and in accordance with any of the disclosed systems, methods, and apparatus herein. Further, the method 2000 includes optimizing and/or tuning one or both of the wireless transmission system and the wireless receiver system for data communications, in view of system characteristics necessary for wireless power transfer, as illustrated at block 2500. Such optimizing and/or tuning includes, but is not limited to including, optimizing power characteristics for concurrent transmission of electrical power signals and electrical data signals, tuning quality factors of antennas for different transmission schemes, among other things and in accordance with any of the disclosed systems, methods, and apparatus herein.

The systems, methods, and apparatus disclosed herein are designed to operate in an efficient, stable and reliable manner to satisfy a variety of operating and environmental conditions. The systems, methods, and/or apparatus disclosed herein are designed to operate in a wide range of thermal and mechanical stress environments so that data and/or electrical energy is transmitted efficiently and with minimal loss. In addition, the system 10 may be designed with a small form factor using a fabrication technology that allows for scalability, and at a cost that is amenable to developers and adopters. In addition, the systems, methods, and apparatus disclosed herein may be designed to operate over a wide range of frequencies to meet the requirements of a wide range of applications.

In an embodiment, a ferrite shield may be incorporated within the antenna structure to improve antenna performance. Selection of the ferrite shield material may be dependent on the operating frequency as the complex magnetic permeability ($\mu=\mu'-j*\mu''$) is frequency dependent. The material may be a polymer, a sintered flexible ferrite sheet, a rigid shield, or a hybrid shield, wherein the hybrid shield comprises a rigid portion and a flexible portion. Additionally, the magnetic shield may be composed of varying material compositions. Examples of materials may include, but are not limited to, zinc comprising ferrite materials such as manganese-zinc, nickel-zinc, copper-zinc, magnesium-zinc, and combinations thereof.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. A method for operating a wireless power transmission system, the method including:
providing, by a transmission controller of the wireless power transmission system, a driving signal for driving a transmission antenna of the wireless power transmission system, the driving signal based, at least, on an operating frequency for the wireless power transmission system;
receiving, by at least one transistor of an amplifier of the wireless power transmission system, the driving signal at a gate of the at least one transistor;
inverting, by the at least one transistor, a direct current (DC) input power signal to generate AC wireless signals at the operating frequency;
determining if transmission or receipt of wireless data signals has begun by determining if the wireless data signals have transitioned from a "high" state to a "low" state;
determining instructions to switch a damping circuit to an active mode, when transmission or receipt of the wireless data signals begins;
receiving, at a damping transistor of a damping circuit, a damping signal for switching the damping transistor to one of an active mode or an inactive mode to control signal damping during transmission or receipt of wireless data signals, wherein the wireless data signals are one of on-off-keyed (OOK) in-band data signals or amplitude-shift-keyed (ASK) in-band data signals; and
selectively damping, by the damping circuit, the AC wireless signals, during transmission of the wireless data signals if the damping signal sets the damping circuit to the active mode.

2. The method of claim 1, wherein determining if the wireless data signals have transitioned from a "high" state to a "low" state" is based, at least in part, on quality factor information ($Q_{Rx}$) of a wireless receiver system to which the wireless power transmission system is configured to transmit the AC wireless signals.

3. The method of claim 1, further comprising receiving $Q_{Rx}$, by the transmission controller, from a receiver sensing system of the wireless power transmission system.

4. The method of claim 1, wherein determining if the transmission or receipt of the wireless data signals has begun includes monitoring the wireless data signals and, determining that a data start message has been detected.

5. The method of claim 1, further comprising determining if transmission or receipt of the wireless data signals has ended, and determining instructions to switch the damping circuit to the inactive mode, when transmission or receipt of the wireless data signals ends.

6. The method of claim 5, wherein determining if transmission or receipt of the wireless data signals has ended includes monitoring a length of time that the wireless data signals have remained high, and, determining that the length of time meets or exceeds a threshold indicating that the transmission or receipt of the wireless data signals has ended.

7. The method of claim 5, wherein determining if the transmission or receipt of the wireless data signals has ended includes monitoring the wireless data signals and, determining that a data end message is detected.

8. The method of claim 1, further comprising instructing a power conditioning system of the wireless power transmission system to raise an input voltage ($V_{P4}$) to the at least one transistor to an elevated input voltage ($V_{P4+}$) when the damping circuit in the active mode, $V_{P4+}$ configured to compensate for power loss in the wireless power transmission system due to activation of the damping circuit.

9. The method of claim 8, further comprising instructing the power conditioning system to reduce $V_{P4+}$ to $V_{P4}$, when the damping signal is deactivated.

10. A wireless power transmission system comprising:
a transmission antenna configured to couple with at least one other antenna and transmit alternating current (AC) wireless signals to the at least one other antenna, the AC wireless signals including wireless power signals and wireless data signals, wherein the wireless data signals are one of on-off-keyed (OOK) in-band data signals or amplitude-shift-keyed (ASK) in-band data signals;
an amplifier, the amplifier including:
at least one transistor that is configured to (i) receive a driving signal at a gate of the at least one transistor, the driving signal configured to drive the transmission antenna based on an operating frequency for the wireless power transmission system and (ii) invert a direct current (DC) input power signal based on the driving signal, to generate the AC wireless signal at an operating frequency, and
a damping circuit that is configured to dampen the AC wireless signals during transmission of the wireless data signals, wherein the damping circuit includes at least a damping transistor that is configured to receive a damping signal for switching the damping transistor to one of an active mode or an inactive mode to control signal damping during transmission or receipt of the wireless data signals; and
a transmission controller that is configured to (i) provide the driving signals to the at least one transistor, (ii) determine if transmission or receipt of the wireless data signals has begun by determining if the wireless data signals have transitioned from a "high" state to a "low" state, (iii) determine instructions to switch the damping circuit to an active mode, when transmission or receipt of the wireless data signals begins, (iv) generate the damping signal by determining when the wireless data signals are transmitted and generating instructions to operate the damping circuit in the active mode when the wireless data signals are transmitted, and (v) perform one or more of encoding the wireless data signals, decoding the wireless data signals, receiving the wireless data signals, or transmitting the wireless data signals.

11. The wireless power transmission system of claim 10, further comprising a voltage regulator configured to provide the direct current (DC) input power to the at least one transistor at an input voltage ($V_{P4}$), and
　wherein the transmission controller is further configured to instruct the voltage regulator to increase $V_{P4}$ to an elevated input voltage ($V_{P4+}$) when the damping circuit is in the active mode, $V_{P4+}$ configured to compensate for power loss in the wireless power transmission system due to activation of the damping circuit.

12. The wireless power transmission system of claim 11, wherein the transmission controller is further configured to instruct the voltage regulator to reduce $V_{P4+}$ to $V_{P4}$, when the damping signal indicates that the damping signal is to be in the inactive mode.

13. The wireless power transmission system of claim 10, wherein the damping circuit further includes a damping resistor that is in electrical series with the damping transistor and is configured for dissipating at least some power from the wireless power signals.

14. The wireless power transmission system of claim 10, wherein the damping circuit further includes a damping capacitor that is in electrical series with, at least, the damping transistor.

15. The wireless power transmission system of claim 10, wherein the damping circuit further includes a diode that is in electrical series with, at least, the damping transistor and is configured for preventing power efficiency loss in the wireless power signals when the damping circuit is not active.

16. A non-transitory, machine-readable medium storing instructions, which, when executed, cause a controller to:
　determine a driving signal for driving a transmitter antenna of a wireless power transmission system, the driving signal based, at least, on an operating frequency for the wireless power transmission system;
　provide the driving signal to at least one transistor of an amplifier of the wireless power transmission system at a gate of the at least one transistor;
　determine a damping signal for a damping transistor of a damping circuit, the damping signal configured to switch the damping transistor to one of an active mode or an inactive mode to control signal damping during transmission or receipt of wireless data signals, the wireless data signals encoded in-band of AC wireless power signals, the AC wireless power signals generated based on the driving signal, wherein the wireless data signals are one of on-off-keyed (OOK) in-band data signals or amplitude-shift-keyed (ASK) in-band data signals;
　determine if transmission or receipt of the wireless data signals has begun by determining if the wireless data signals have transitioned from a "high" state to a "low" state; and
　provide the damping signal to the damping circuit, the damping signal instructing the damping circuit to selectively damp the AC wireless signals based, at least in part, on wireless data signals that are in-band of the AC wireless signals.

\* \* \* \* \*